United States Patent
Fujitsuka

(10) Patent No.: US 9,939,931 B2
(45) Date of Patent: Apr. 10, 2018

(54) POSITION INDICATOR AND POSITION DETECTING DEVICE

(71) Applicant: Wacom Co., Ltd., Saitama (JP)

(72) Inventor: Hiroyuki Fujitsuka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 67 days.

(21) Appl. No.: 15/224,187

(22) Filed: Jul. 29, 2016

(65) Prior Publication Data
US 2016/0334894 A1 Nov. 17, 2016

Related U.S. Application Data

(63) Continuation of application No. PCT/JP2015/051467, filed on Jan. 21, 2015.

(30) Foreign Application Priority Data

Jan. 31, 2014 (JP) .................. 2014-016311

(51) Int. Cl.
*G06F 3/0354* (2013.01)
*G06F 3/038* (2013.01)
*G06F 3/044* (2006.01)

(52) U.S. Cl.
CPC ........ *G06F 3/03545* (2013.01); *G06F 3/0383* (2013.01); *G06F 3/044* (2013.01)

(58) Field of Classification Search
CPC .............................. G06F 3/038; G06F 3/03545
See application file for complete search history.

(56) References Cited

U.S. PATENT DOCUMENTS

| | | | |
|---|---|---|---|
| 2010/0117994 A1 | 5/2010 | Fukushima et al. | |
| 2011/0241703 A1 | 10/2011 | Fukushima et al. | |
| 2013/0269446 A1* | 10/2013 | Fukushima .......... | G01B 5/0004 73/818 |

FOREIGN PATENT DOCUMENTS

| | | |
|---|---|---|
| JP | 04-096212 A | 3/1992 |
| JP | 6-129929 A | 5/1994 |

(Continued)

OTHER PUBLICATIONS

International Search Report received in corresponding application PCT/JP2015/051467, dated Apr. 14, 2015, 2 pages.

*Primary Examiner* — Dennis Joseph
(74) *Attorney, Agent, or Firm* — Seed Intellectual Property Law Group LLP

(57) ABSTRACT

A position indicator includes a chassis, a core body, and a variable capacitance capacitor. The capacitor includes a dielectric, a first conductor disposed on a first surface of the dielectric, a first terminal coupled to the first conductor, forming a first electrode, a second conductor disposed on a second surface of the dielectric, an electrically-conductive member disposed opposed to the second surface of the dielectric, a second terminal that forms a second electrode of the capacitor with the second conductor and the electrically-conductive member, and an elastic member. In operation, the elastic member applies a biasing force to separate the electrically-conductive member from the second surface of the dielectric. The electrically-conductive member contacts the second conductor on the second surface of the dielectric in response to the force applied through the core body, and, in response to the contact, a capacitance of the capacitor changes to a determined capacitance.

12 Claims, 9 Drawing Sheets

(56) References Cited

FOREIGN PATENT DOCUMENTS

| | | |
|---|---|---|
| JP | 2010-117943 A | 5/2010 |
| JP | 2010-129920 A | 6/2010 |
| JP | 2011-216512 A | 10/2011 |

* cited by examiner

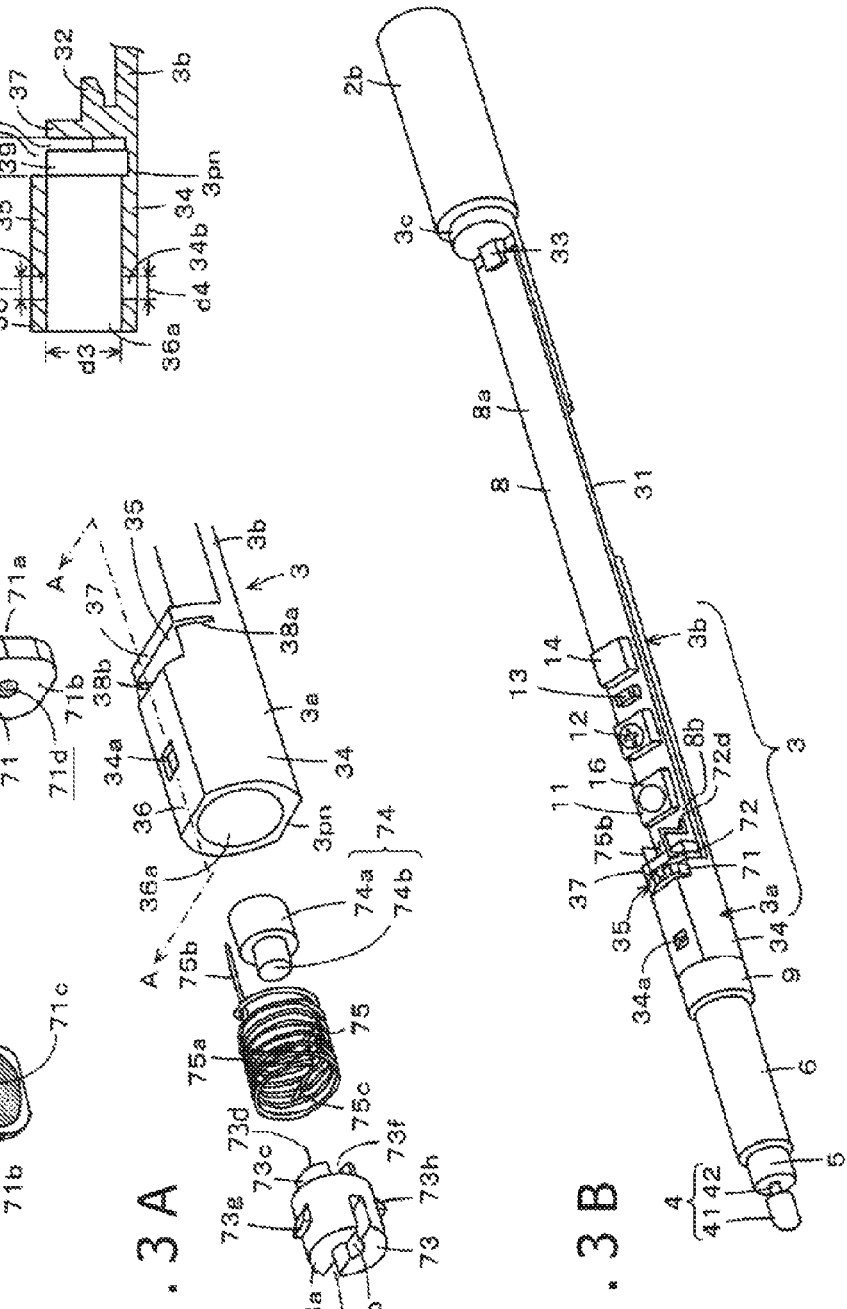

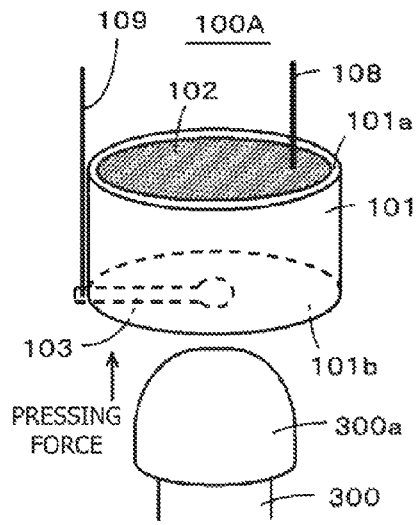
FIG. 9A (Prior Art)
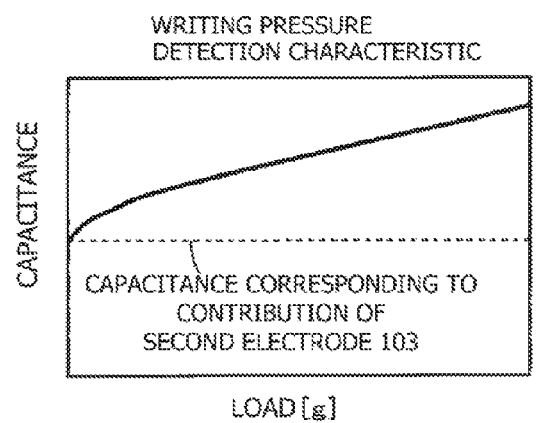
FIG. 9B (Prior Art)
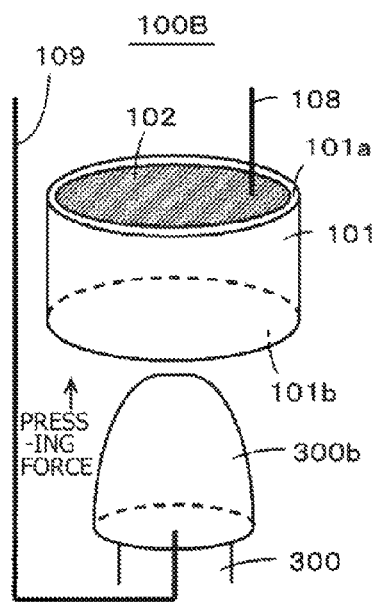
FIG. 10A (Prior Art)
FIG. 10B (Prior Art)

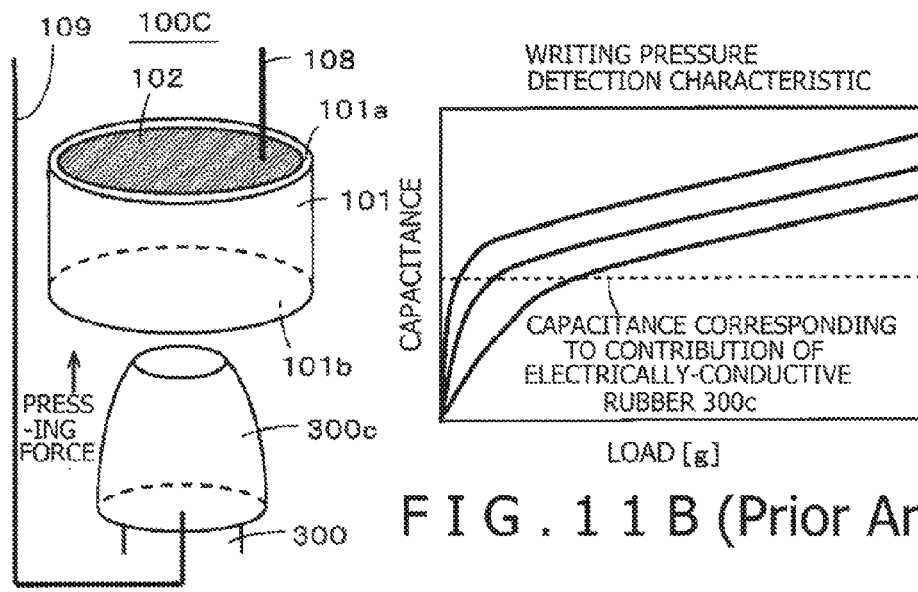
FIG. 11A (Prior Art)
FIG. 11B (Prior Art)
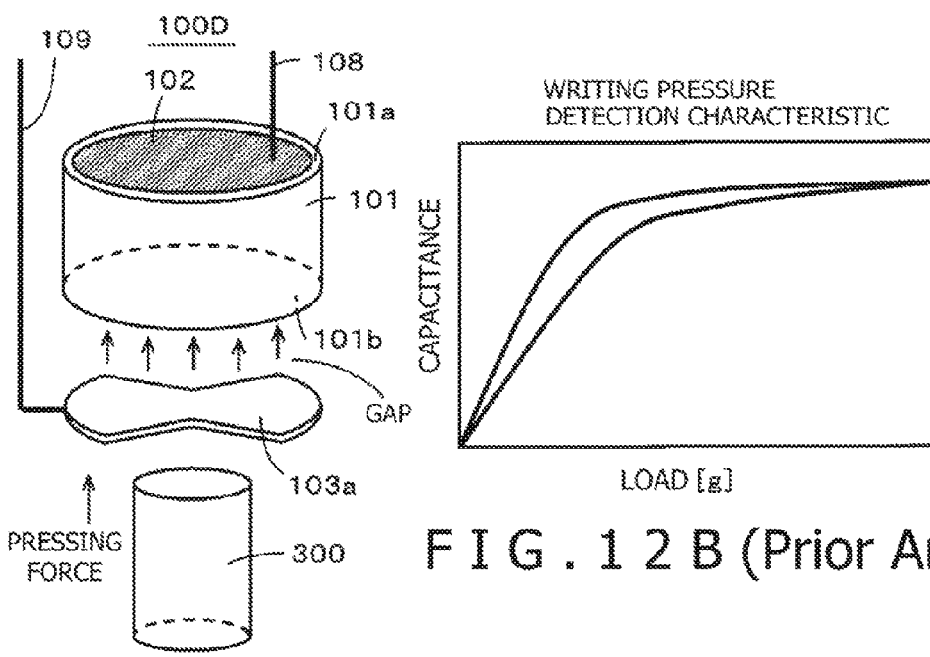
FIG. 12A (Prior Art)
FIG. 12B (Prior Art)

POSITION INDICATOR AND POSITION DETECTING DEVICE

BACKGROUND

Technical Field

The present disclosure relates to a pen-type position indicator having a function of detecting the writing pressure and a position detecting device configured to be equipped with the position indicator.

Description of the Related Art

A coordinate input device is used as an input device of an information processing device such as a personal computer. For example, the coordinate input device may comprise a pen-type position indicator and a position detecting device having an input surface to which pointing operation and input of characters, figures, and so forth are carried out by using this position indicator. For example, in the case of carrying out design or layout by using a personal computer and the coordinate input device, a user may wish to vary the width of the input line. In this case, by detecting the pressure (writing pressure) applied by the user in the position indicator and transmitting it to the position detecting device, input of information (e.g., line width) according to the writing pressure of the user is enabled. For the detection of the writing pressure applied by the user in the position indicator, a variable-capacitance capacitor described in Patent Document 1 is used conventionally.

FIGS. 8A and 8B show the schematic configuration of a variable-capacitance capacitor 100 disclosed in Patent Document 1. The variable-capacitance capacitor 100 has a dielectric 101 having a substantially circular disc shape, a first electrode 102 attached to one surface (first surface) 101a of the dielectric, and a second electrode 103 that is disposed on the side of a surface (second surface) 101b of the dielectric 101 opposite of the first surface 101a, with the intermediary of a ring-shaped spacer 104 and has flexibility. A first terminal 108 is coupled to the first electrode 102 and a second terminal 109 is coupled to the second electrode 103. On the side of the surface of the second electrode 103 on the opposite side to the surface opposed to the dielectric 101, a substantially rod-shaped or cylindrical-shaped core body 300 continuous with the pen tip of the position indicator is disposed with the intermediary of an elastic body 105.

In the variable-capacitance capacitor 100 having such a configuration, in the state in which the writing pressure of the user is not applied to the pen tip (initial state), the state in which the second surface 101b of the dielectric 101 and the second electrode 103 are separated by the spacer 104 is kept (FIG. 8A). For this reason, an air layer 600 corresponding to the thickness of the spacer 104 is formed between the second surface 101b of the dielectric 101 and the second electrode 103. The electrical capacitance between the first terminal 108 and the second terminal 109 at this time is a series combined capacitance of the electrical capacitance possessed by the dielectric 101 and the electrical capacitance possessed by the air layer 600 with a relative permittivity of, for example, 1.0, and is considerably low.

In contrast, when the writing pressure of the user is applied to the pen tip, the core body 300 is displaced toward the dielectric 101 according to the writing pressure. Thus, the second electrode 103 curves toward the dielectric 101 and gets closer to the dielectric 101. In this case, the electrical capacitance of the air layer 600 becomes higher in inverse proportion to the thickness thereof and the electrical capacitance between the first terminal 108 and the second terminal 109 becomes higher. Thereafter, when the second electrode 103 contacts the second surface 101b of the dielectric 101 as shown in FIG. 8B, the electrical capacitance between the first terminal 108 and the second terminal 109 increases in proportion to the contact area between the other surface 101b of the dielectric 101 and the second electrode 103. Therefore, the pressure (writing pressure) applied to the pen tip continuous with the core body 300 can be detected by detecting change in the electrical capacitance between the first terminal 108 and the second terminal 109.

As above, in the position indicator, the first electrode is attached to one surface (first surface) of the dielectric and the second electrode is disposed on the side of the other surface (second surface) in an opposed manner. Furthermore, the second electrode is pressed against the second surface of the dielectric by the core body according to the writing pressure to form the variable-capacitance capacitor. In this case, the writing pressure may be detected due to change in the electrical capacitance of this capacitor, which changes depending on the contact area between the second surface of the dielectric and the second electrode pressed against it according to the writing pressure.

Regarding the variable-capacitance capacitor for writing pressure detection of the position indicator, various improvements have been made for the purpose of simplification of the configuration, enhancement in the sensitivity of the writing pressure detection, and so forth. FIGS. 9A to 12B are diagrams illustrating improved variable-capacitance capacitors for writing pressure detection of the position indicator. For example, in Patent Document 2, a variable-capacitance capacitor 100A shown in FIG. 9A is disclosed. In the variable-capacitance capacitor 100A, a first electrode 102 is attached to a first surface 101a of a dielectric 101 and a first terminal 108 is coupled to the first electrode 102. A line-shaped second electrode 103 having a part in which the tip is formed into a circular shape is attached to a second surface 101b of the dielectric and a second terminal is coupled to this second electrode 103.

Moreover, a core body 300 continuous with the pen tip is disposed opposed to the second surface 101b of the dielectric 101 and this core body 300 has an electrically-conductive rubber part 300a having, e.g., a dome shape at the end part on the opposite side to the pen tip. Therefore, when the electrically-conductive rubber part 300a makes contact with the second surface 101b of the dielectric 101, the electrically-conductive rubber part 300a also functions as the second electrode. The variable-capacitance capacitor 100A of this example has initial capacitance C0 because the second electrode 103 is already attached to the second surface 101b of the dielectric 101.

When a writing pressure by a user is applied to the pen tip of the position indicator, the electrically-conductive rubber part 300a provided at the end part of the core body 300 continuous with the pen tip on the opposite side to the pen tip moves toward the dielectric 101. The electrically-conductive rubber part 300a contacts the second electrode 103 attached to the second surface of the dielectric 101 in this manner, and collapses, so that the contact area with the second surface of the dielectric 101 becomes larger. This changes the electrical capacitance between the first electrode 102 and the second electrode 103, and the writing pressure may be detected according to this.

In the case of the variable-capacitance capacitor 100A, as shown in a writing pressure detection characteristic of FIG. 9B, the variable-capacitance capacitor 100A has the initial capacitance C0 even in the state in which the writing pressure is not applied, which allows the writing pressure to be detected by lightly applying a force to the pen tip. However, because the initial rise is improved by the function of the second electrode 103 attached to the second surface 101b of the dielectric 101, the range in which the writing pressure can be accurately detected becomes a range on the upper side of a dotted line shown in FIG. 9B, so that the resolution of the writing pressure decreases.

In Patent Document 3, a variable-capacitance capacitor 100B shown in FIG. 10A is disclosed. In the variable-capacitance capacitor 100B, a first electrode 102 is attached to a first surface 101a of a dielectric 101 and a first terminal 108 is coupled to this first electrode 102. Moreover, a core body 300 continuous with the pen tip is disposed opposed to a second surface 101b of the dielectric 101. This core body 300 has an electrically-conductive rubber part 300b having, e.g., a dome shape at the end part on the opposite side to the pen tip and a second terminal 109 is coupled to this electrically-conductive rubber part 300b. Therefore, it is not until the electrically-conductive rubber part 300b contacts the second surface 101b of the dielectric 101 that the electrically-conductive rubber part 300b functions as a second electrode to form the variable-capacitance capacitor.

Furthermore, when a writing pressure by a user is applied to the pen tip of the position indicator, the electrically-conductive rubber part 300b provided at the end part of the core body 300 continuous with the pen tip on the opposite side to the pen tip moves toward the dielectric 101. Thereafter, the electrically-conductive rubber part 300b contacts the second surface of the dielectric 101 and collapses, so that the contact area with the second surface of the dielectric 101 becomes larger. This changes the electrical capacitance between the first electrode 102 and the second electrode 103, and the writing pressure may be detected according to this change. In the case of the variable-capacitance capacitor 100B, the electrical capacitance changes according to the contact area between the second surface 101b of the dielectric 101 and the electrically-conductive rubber part 300b as the second electrode. For this reason, by using the variable-capacitance capacitor 100B, the writing pressure can be accurately detected in a wide range from a light writing pressure to a heavy writing pressure as shown in a writing pressure detection characteristic of FIG. 10B.

However, as is understood through comparison between the writing pressure detection characteristics of FIG. 9B and FIG. 10B, in the case of the variable-capacitance capacitor 100B, the slope of the initial rise is small compared with the variable-capacitance capacitor 100A. To detect the writing pressure only when a pressure is applied by the user, the electrical capacitance of the variable-capacitance capacitor 100B needs to be raised to a determined writing pressure detection threshold over which it can be determined that the writing pressure is being surely applied. However, the slope of the writing pressure detection characteristic is small as shown in FIG. 10B. For this reason, a determined amount of load (writing pressure) needs to be applied until the electrical capacitance of the variable-capacitance capacitor 100B increases to the writing pressure detection threshold. Thus, the initial rise sensitivity is lowered (becomes dull) compared with the variable-capacitance capacitor 100A shown in FIG. 9A.

For this reason, it is conceivable that, as shown in FIG. 11A, an electrically-conductive rubber part 300c whose tip is flattened to have a certain amount of area is provided at the end part of the core body 300 on the opposite side to the pen tip. In a variable-capacitance capacitor 100C, the respective parts other than the electrically-conductive rubber part 300c are formed similarly to the variable-capacitance capacitor 100B shown in FIG. 10A. In the case of the variable-capacitance capacitor 100C, when the second surface 101b of the dielectric 101 contacts the electrically-conductive rubber part 300c, the contact is made with a determined area from the beginning.

For this reason, in the case of the variable-capacitance capacitor 100C, a characteristic in which the initial rise is early can be made as shown in writing pressure detection characteristics of FIG. 11B. However, in the case of the variable-capacitance capacitor 100C, the initial rise is improved by flattening the tip part of the electrically-conductive rubber part 300c and thus the range in which the writing pressure can be accurately detected becomes a range on the upper side of a dotted line shown in FIG. 11B. Therefore, also in the variable-capacitance capacitor 100C shown in FIG. 11A, the resolution of the writing pressure decreases similarly to the case of the variable-capacitance capacitor 100A shown in FIG. 9A.

Furthermore, in the case of the variable-capacitance capacitor 100C shown in FIG. 11A, the tip of the end part of the electrically-conductive rubber part 300c on the opposite side to the pen tip is flattened as described above. For this reason, under the influence of the attaching state of the electrically-conductive rubber part 300c and so forth, how the electrically-conductive rubber part 300c contacts the second surface part of the dielectric 101 differs for each position indicator equipped with the variable-capacitance capacitor 100C. Therefore, as shown by the three writing pressure detection characteristics in FIG. 11B, there is a case in which variation is caused in the initial rise rate of the writing pressure detection characteristic for each position indicator equipped with this variable-capacitance capacitor 100C.

This possibly occurs also in the same position indicator equipped with this variable-capacitance capacitor 100C. Specifically, variation may occur in the initial rise rate according to how the electrically-conductive rubber part 300c contacts the second surface part 101b of the dielectric 101 differs under the influence of how the position indicator is tilted at the time of use and so forth. In this case, even with the same position indicator, there is a possibility that variation is caused in the touch of writing for every use.

In Patent Document 4, a variable-capacitance capacitor 100D shown in FIG. 12A is disclosed. In the variable-capacitance capacitor 100D, a first electrode 102 is attached to a first surface 101a of a dielectric 101 and a first terminal 108 is coupled to this first electrode 102. On the side of a second surface 101b of the dielectric 101, a second electrode 103a that has flexibility and has an extending part extending from the center in a radial manner is disposed with the intermediary of a ring-shaped spacer although the spacer is not shown in the diagram. A second terminal 109 is coupled to the second electrode 103a. The second electrode 103a has a so-called ribbon shape. On the side of the surface of the second electrode 103a on the opposite side to the surface opposed to the dielectric 101, a rod-shaped core body 300 continuous with the pen tip of the position indicator is disposed with the intermediary of an elastic body although the elastic body is not shown in the diagram.

That is, the variable-capacitance capacitor 100D shown in FIG. 12A has a configuration similar to that of the variable-capacitance capacitor 100 described by using FIGS. 8A and 8B except for that the shape of the second electrode 103 is different. In the case of the variable-capacitance capacitor 100D, the slope of the writing pressure detection characteristic can be adjusted depending on the shape of the second electrode as shown in writing pressure detection characteristics of FIG. 12B for example.

Specifically, the slope can be made smaller when the area of the extending part extending from the center of the second electrode 103a in a radial manner is set smaller, and the slope can be made larger when the area of this extending part is set larger. This can change the so-called touch of writing. However, when the slope of the writing pressure detection characteristic is made smaller, the detection sensitivity of the writing pressure becomes duller although the resolution of the writing pressure increases. Conversely, when the slope of the writing pressure detection characteristic is made larger, the resolution of the writing pressure decreases although the detection sensitivity of the writing pressure becomes sharper.

As above, in the position indicator, various improvements are made in order to enhance the degree of satisfaction of the user regarding the variable-capacitance capacitor for detecting the writing pressure of the user. However, the relationship between the detection sensitivity of the writing pressure and the resolution of the writing pressure is a so-called trade-off relationship. Furthermore, as described by using FIGS. 11A and 11B, there is also the variable-capacitance capacitor involving an inconvenience that variation is possibly caused in the initial rise rate because of its configuration.

PRIOR ART DOCUMENTS

Patent Documents

Patent Document 1: Japanese Patent No. 3150685
Patent Document 2: Japanese Patent Laid-Open No. 2010-117943
Patent Document 3: Japanese Patent Laid-Open No. 2010-129920
Patent Document 4: Japanese Patent Laid-Open No. 2011-216512

BRIEF SUMMARY

Technical Problems

In recent years, tablet personal computers (PCs) and high-function mobile phone terminals called smartphones have been becoming widely used. Portable terminals such as the tablet PCs and the high-function mobile phone terminals include a display device such as a liquid crystal display (LCD) whose display screen is comparatively large and a touch panel formed of various touch sensors, and input by use of a pen-type position indicator is also carried out. It is desired that input according to the writing pressure is allowed also in the case of making input in such a portable terminal by using the pen-type position indicator.

In the case of using the portable terminal, normally input operation is carried out with the portable terminal held with one hand by using the position indicator held with the other hand. Thus, there is a need to allow the input to be carried out with a light touch. For this reason, it is conceivable that the variable-capacitance capacitor with high initial rise sensitivity described by using FIG. 9A and FIG. 11A is used as the variable-capacitance capacitor used for writing pressure detection in the position indicator. However, in the case of the variable-capacitance capacitors 100A and 100C described by using FIG. 9A and FIG. 11A, the resolution of the writing pressure decreases as a trade-off to the variable-capacitance capacitors 100A and 100C being configured to improve the initial rise. Furthermore, in the case of the variable-capacitance capacitor 100C described by using FIG. 11A, a problem that there is a possibility that variation is caused in the initial rise rate of the writing pressure detection characteristic occurs in some cases.

Also with the portable terminal, it may be desired that the resolution of the detected writing pressure is as high as possible. Furthermore, it also may be desired that variation is not caused in the initial rise rate of the writing pressure detection characteristic and the same touch of writing may be offered at any time. For this reason, it is also conceivable that the variable-capacitance capacitor 100B described by using FIG. 10A, which has a high resolution of the writing pressure and does not cause variation in the initial rise rate of the writing pressure detection characteristic, is used. However, in the variable-capacitance capacitor 100B described by using FIG. 10A, the sensitivity (response) of the initial rise is dull compared with the variable-capacitance capacitors 100A and 100C shown in FIG. 9A and FIG. 11A also as described above. For this reason, when attempting to enhance the sensitivity of the initial rise, the user of the portable terminal needs to apply a writing pressure equal to or higher than a certain level to the position indicator from the beginning. However, in this case, there will be a case in which the portable terminal held with a hand becomes unstable and the input becomes difficult.

In an embodiment, a position indicator facilitates improving both the initial rise characteristic at the time of writing pressure detection and the resolution of the writing pressure, and is suitable to be used for a portable terminal in a position indicator that uses a variable-capacitance capacitor to enable detection of the writing pressure.

Technical Solution

In an embodiment, a position indicator includes a chassis, a core body that is formed into a substantially rod shape and is housed in the chassis, with one end protruding to an outside of the chassis, and a capacitor whose capacitance changes due to an external force applied through the core body, wherein the capacitor includes a dielectric having a first surface part and a second surface part opposed to the first surface part, a first conductor disposed on the first surface part of the dielectric, a first terminal part that is coupled to the first conductor of the dielectric and forms a first electrode of the capacitor with the first conductor, a second conductor disposed on the second surface part of the dielectric, an electrically-conductive member disposed opposed to the second surface part, a second terminal part that forms a second electrode of the capacitor with the second conductor and the electrically-conductive member, and an elastic member for biasing the electrically-conductive member into a state in which the electrically-conductive member is separated from the second surface part of the dielectric, and the electrically-conductive member contacts the second conductor on the second surface part of the dielectric against a biasing force of the elastic member by the external force and, at the time of the contact, the capacitance of the capacitor changes to a determined capacitance according to an opposing area between the first conductor and the second conductor larger than a contact area between the electrically-conductive member and the second conductor.

In an embodiment, the position indicator has the chassis, the core body continuous with the pen tip, and the capacitor whose electrical capacitance changes due to the external force applied through the core body. The capacitor includes the dielectric having the first and second surface parts that are opposed. The first conductor is disposed on the first surface part of the dielectric and the first terminal part is to the first conductor to form the first electrode part. The second conductor is disposed on the second surface part of the dielectric. Furthermore, the electrically-conductive member is disposed opposed to the second surface part of the dielectric and the second terminal part is coupled to this electrically-conductive member to form the second electrode part. The electrically-conductive member is biased by the elastic member into the state of being separated from the second surface part of the dielectric.

Due to the application of the external force to the core body, the electrically-conductive member moves toward the second surface part of the dielectric. When the electrically-conductive member contacts the second conductor on the second surface part of the dielectric, the capacitance of the capacitor changes to a determined capacitance according to the opposing area between the first conductor and the second conductor being larger than the contact area between the electrically-conductive member and the second conductor at the time of the contact. That is, with only the extremely-slight contact between the electrically-conductive member and the second conductor, the capacitance of the capacitor rapidly changes to the determined capacitance according to the opposing area between the first conductor and the second conductor.

This may improve the sensitivity of the initial rise of the capacitor. Furthermore, the abutting area between the electrically-conductive member and the second surface part of the dielectric changes according to the external force applied to the core body, and the capacitance of the capacitor may also be changed corresponding to this. Therefore, the capacitance of the capacitor may also be properly changed according to the external force and the resolution of the writing pressure may also be improved.

Advantageous Effect

According to an embodiment, a position indicator in which both the initial rise characteristic at the time of writing pressure detection and the resolution of the writing pressure are improved and that is suitable to be used for a portable terminal may be realized in a position indicator that uses a capacitor to enable detection of the writing pressure.

In an embodiment, a position indicator comprises: a chassis; a core body having a substantially rod shape housed in the chassis, with one end of the core body protruding outside of the chassis; and a variable capacitance capacitor, wherein, in operation, the capacitance of the variable capacitance capacitor changes in response to force applied through the core body; the variable capacitance capacitor includes: a dielectric having a first surface and a second surface opposed to the first surface; a first conductor disposed on the first surface of the dielectric; a first terminal coupled to the first conductor of the dielectric, forming a first electrode of the variable capacitance capacitor with the first conductor; a second conductor disposed on the second surface of the dielectric; an electrically-conductive member disposed opposed to the second surface of the dielectric; a second terminal that forms a second electrode of the variable capacitance capacitor with the second conductor and the electrically-conductive member; and an elastic member, which, in operation, applies a biasing force to separate the electrically-conductive member from the second surface of the dielectric; and in operation, the electrically-conductive member contacts the second conductor on the second surface of the dielectric in response to the force applied through the core body, and, in response to the contact, a capacitance of the capacitor changes to determined capacitance according to an opposing area between the first conductor and the second conductor, the opposing area being larger than a contact area between the electrically-conductive member and the second conductor. In an embodiment, the position indicator comprises: a circuit, which, in operation, transmits a signal according to the force applied through the core body, wherein the first terminal part and the second terminal part are coupled to the circuit. In an embodiment, in operation, the capacitance of the variable capacitance capacitor changes according to a change in the force applied through the core body and depends on an area of contact between the electrically-conductive member and the second surface of the dielectric as the electrically conductive member spreads out beyond the second conductor and contacts the second surface of the dielectric. In an embodiment, the second conductor has a smaller area than the first conductor. In an embodiment, the electrically-conductive member includes a curved surface that bulges toward a side opposed to the second surface of the dielectric and, in operation, gradually contacts the second surface of the dielectric from a tip of the curved surface, and the second conductor is positioned where the tip of the curved surface of the electrically-conductive member contacts the second surface of the dielectric. In an embodiment, a surface of the second surface of the dielectric opposed to the electrically-conductive member is a mirror processed surface. In an embodiment, in operation, the variable capacitance capacitor has a determined capacitance according to areas of the first conductor and the second conductor after the electrically-conductive member makes contact with the second conductor, and the capacitance of the variable capacitance capacitor changes in response to changes in the force applied through the core body based on changes in an area of contact between the electrically-conductive member and the second surface of the dielectric as the electrically-conductive member spreads beyond the second conductor and makes contact with the second surface of the dielectric. In an embodiment, the second conductor has a center position which corresponds with a center position of the second surface of the dielectric. In an embodiment, the second conductor has a shape with a center position eccentric from a center of the second surface of the dielectric. In an embodiment, the position indicator comprises: a resonant circuit including the variable capacitance capacitor, wherein, in operation, the position indicator couples to a position detecting device of an electromagnetic induction system. In an embodiment, the core body is formed of an electrically-conductive material and, in operation, the position indicator couples to a position detecting device of a capacitance system by allowing a user and the core body to be electrically coupled.

In an embodiment, a position detecting device comprises: a position indicator, the position indicator including a chassis, a core body having a substantially rod shape housed in the chassis, with one end of the core body protruding outside of the chassis, and a variable capacitance capacitor, wherein, in operation, the capacitance of the variable capacitance capacitor changes in response to force applied through the core body, the variable capacitance capacitor including a dielectric having a first surface and a second surface opposed to the first surface, a first conductor disposed on the first surface of the dielectric, a first terminal coupled to the first conductor of the dielectric, forming a first electrode of the variable capacitance capacitor with the first conductor, a second conductor disposed on the second surface of the dielectric, an electrically-conductive member disposed opposed to the second surface of the dielectric, a second terminal that forms a second electrode of the variable capacitance capacitor with the second conductor and the electrically-conductive member, and an elastic member, which, in operation, applies a biasing force to separate the electrically-conductive member from the second surface of the dielectric, wherein, in operation, the electrically-conductive member contacts the second conductor on the second surface of the dielectric in response to the force applied through the core body, and, in response to the contact, a capacitance of the variable capacitance capacitor changes to a determined capacitance according to an opposing area between the first conductor and the second conductor; a receiving circuit, which, in operation, receives a signal from the position indicator; and a detecting circuit, which, in operation, detects, from the received signal, change in the capacitance as change in a writing pressure applied to the position indicator.

BRIEF DESCRIPTION OF THE SEVERAL VIEWS OF THE DRAWINGS

FIGS. 3A to 3D show exploded perspective views of part of an embodiment of a position indicator.

FIGS. 9A and 9B show diagrams for explaining one example of the conventional variable-capacitance capacitor.

FIGS. 10A and 10B show diagrams for explaining one example of the conventional variable-capacitance capacitor.

FIGS. 11A and 11B show diagrams for explaining one example of the conventional variable-capacitance capacitor.

FIGS. 12A and 12B show diagrams for explaining one example of the conventional variable-capacitance capacitor.

DETAILED DESCRIPTION

An embodiment of a position indicator will be described below with reference to the drawings.

FIG. 1A to 1B and FIG. 3A to 3D are diagrams for explaining a configuration example of an embodiment of a position indicator. FIG. 2 shows one example of electronic equipment 200 using a position indicator 1 of an embodiment. In this example, the electronic equipment 200 is a high-function mobile phone terminal having a display screen 200D of a display device such as a liquid crystal display (LCD) for example, and includes a position detecting device 202 of an electromagnetic induction system under (on the back side of) the display screen 200D.

The chassis of the electronic equipment 200 of this example has a housing recess 201 to house the position indicator 1 having a pen shape. According to need, a user takes out the position indicator 1 housed in the housing recess 201 from the electronic equipment 200 and carries out position indication operation on the display screen 200D.

In the electronic equipment 200, when the position indication operation is carried out on the display screen 200D by the position indicator 1 having the pen shape, the position detecting device 202 provided on the back side of the display screen 200D receives a signal of the position indicator 1 by a receiving circuit (not shown in the diagram). Moreover, the position detecting device 202 carries out detection by a detecting circuit (not shown in the diagram) as the position at which the operation is carried out by the position indicator 1 and the writing pressure and detects the position at which the operation is carried out by the position indicator 1 and the writing pressure, and a microcomputer included in the position detecting device 202 of the electronic equipment 200 executes display processing according to the operation position in the display screen 200D and the writing pressure.

Figure 1A:
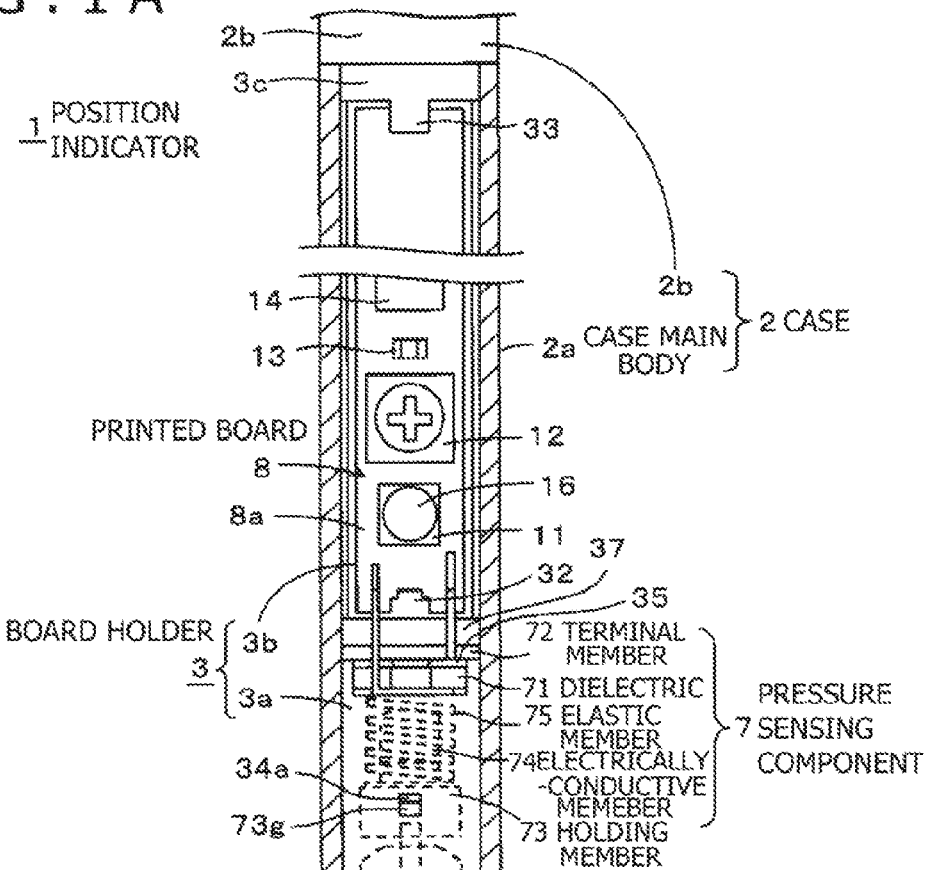
FIGS. 1A and 1B show diagrams for explaining a configuration example of an embodiment of a position indicator.
Figure 1B:
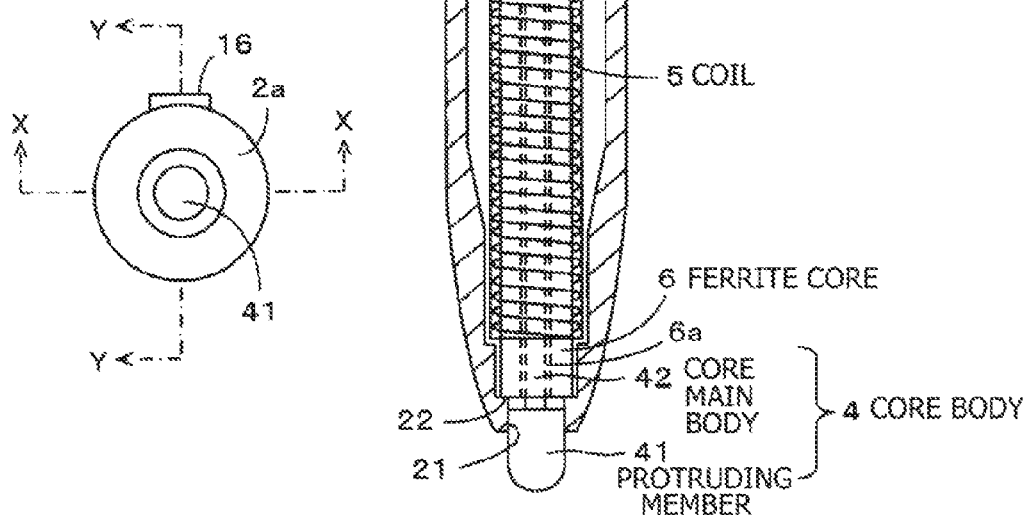
Figure 2:
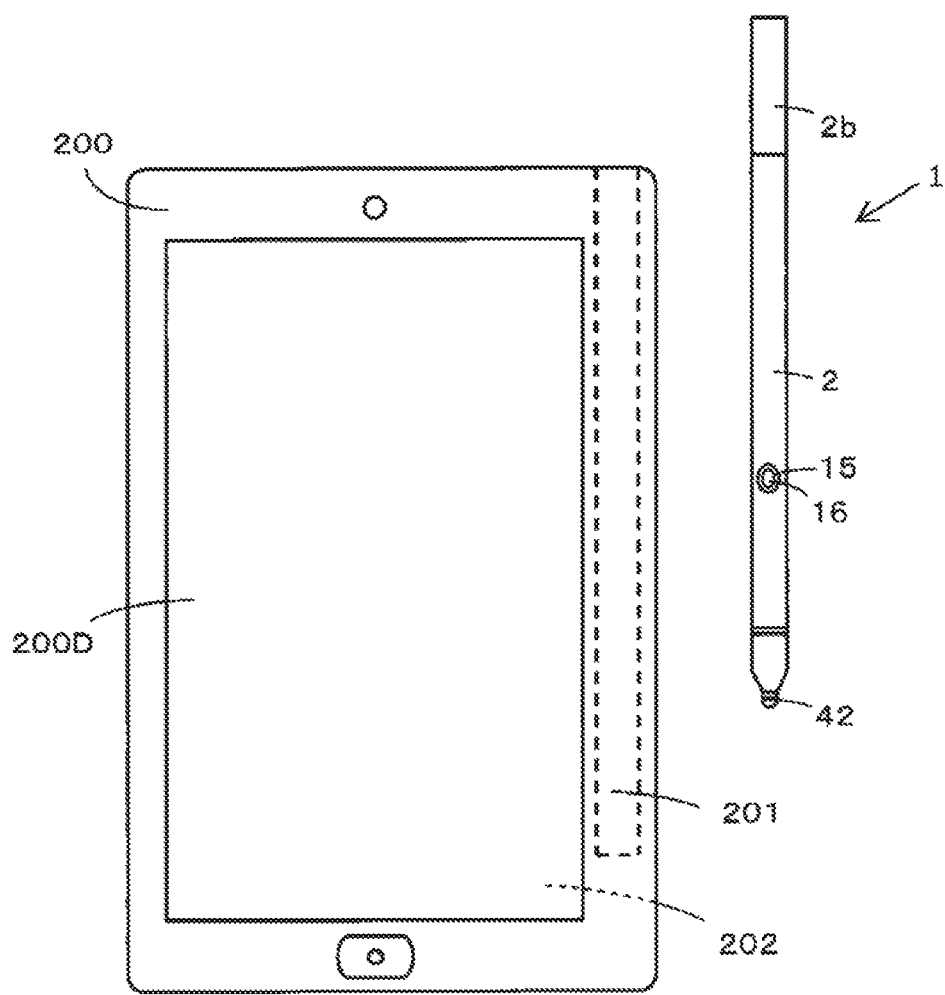
FIG. 2 is a diagram showing an embodiment of a position indicator and an example of electronic equipment including a position detecting device used with a position indicator.

FIGS. 1A and 1B show the outline of the position indicator 1 of this embodiment. FIG. 1A is a cross-sectional diagram along the length of a case main body 2a of a case 2 (chassis) of the position indicator 1 to show the inside thereof for explanation. Furthermore, FIG. 1B is a cross-sectional diagram of the position indicator 1 of an embodiment viewed in the axial center direction from the side of a core body 4.

As shown in FIG. 1A, the position indicator 1 includes the case 2 that is elongated in the axial center direction and forms a bottomed circular cylindrical chassis with one side closed. This case 2 is formed of, e.g., a resin or the like and comprises the case main body 2a that internally has a hollow part and has a circular cylindrical shape and a case cap 2b joined to this case main body 2a. In the hollow part of the case main body 2a, the core body 4 having a substantially rod shape and a magnetic core, a ferrite core 6 in this example, around which a coil 5 is wound are joined to a board holder 3 and are housed. The ferrite core 6 has a circular columnar shape in this example.

The board holder 3 comprises a resin for example and is so formed that a pressure sensing component holder part 3a and a printed board placement base part 3b are continuous in the longitudinal direction along the axial center direction of the position indicator 1 when the board holder 3 is housed in the hollow part of the case main body 2a. A pressure sensing component (plural components for writing pressure detection) 7 is housed in the pressure sensing component holder part 3a and a printed board 8 is placed and held on the printed board placement base part 3b. Hereinafter, the pressure sensing component holder part 3a will be abbreviated as the holder part 3a for simplification of description. As illustrated, the holder part 3a is positioned closest to the core body 4 in the board holder 3, and the core body 4 and the ferrite core 6 are joined to the holder part 3a.

Furthermore, FIG. 3B is a diagram showing an example configuration in which the board holder 3 is joined to the core body 4 and the ferrite core 6. Moreover, FIG. 3A is an exploded perspective view for explaining an example configuration of the holder part 3a of the board holder 3 and the pressure sensing component 7. In addition, FIG. 3C is a sectional view along line A-A in FIG. 3A and this is a longitudinal sectional view of the holder part 3a of the board holder 3. Furthermore, FIG. 3D is a diagram showing a surface on the opposite side to a surface of a dielectric 71 shown in FIG. 3A.

As shown in FIG. 3B, the printed board 8 is placed on the printed board placement base part 3b of the board holder 3.

The printed board 8 has an elongated rectangular shape that has a width smaller than the inner diameter of the case main body 2a and has a determined length in the longitudinal direction. The length of the board placement plane of the printed board placement base part 3b in the longitudinal direction is set to a length almost equal to or slightly larger than the length of the printed board 8 in the longitudinal direction. Furthermore, the length of the board placement plane of the printed board placement base part 3b in the width direction is selected to be slightly larger than the width of the printed board 8.

Although diagrammatic representation is omitted, one end and the other end of the coil 5 are extended to the printed board 8 by utilizing a gap between the board holder 3 and the case main body 2a and are, e.g., soldered to an electrically-conductive pattern formed on this printed board 8. In the example of FIG. 3B, a notch part 31 is formed at part of the board holder 3 in the longitudinal direction. Furthermore, one end and the other end of the coil 5 are soldered on the back surface side on the opposite side to a board surface 8a of the printed board 8 and are coupled to a conductor pattern on the board surface 8a via a through-hole.

On this printed board 8, a push switch (side switch) 11 that enters an on-state when being pressed down and returns to an off-state when the pressing-down is stopped is provided. In addition, capacitors 12 and 13 that form a resonant circuit with the coil 5 are provided. In this example, the capacitor 12 is a trimmer capacitor, whose capacitance can be adjusted. Moreover, in this first embodiment, an integrated circuit (IC) 14 is provided and other circuit components and conductor patterns, whose diagrammatic representation is omitted, are positioned on the printed board 8.

Furthermore, in this example, a through-hole 15 (see FIG. 2) is bored at a position corresponding to the side switch 11 in the side circumferential surface of the case main body 2a of the position indicator 1, and a pressing-down operation element 16 of the side switch 11 is exposed so that this side switch 11 can be pressed down through this through-hole 15. In this case, for the pressing-down operation of the side switch 11 by the pressing-down operation element 16, assignment setting of a determined function is carried out on the side of the electronic equipment 200 including the position detecting device 202. For example, in the electronic equipment 200 of this example, for the pressing-down operation of the side switch 11 by the pressing-down operation element 16, assignment setting as operation similar to click operation in a pointing device such as a mouse is possible.

The capacitors 12 and 13, which form part of the resonant circuit, and the IC 14 are disposed on the printed board 8 as chip components in this example. Furthermore, in this embodiment, the resonant frequency of the resonant circuit is adjusted through adjustment of the capacitance of the trimmer capacitor 12.

In the case of this example, at both end parts of the printed board placement base part 3b of the board holder 3 in the longitudinal direction, locking parts 32 and 33 that lock the printed board 8 to the printed board placement base part 3b by clamping the printed board 8 in the thickness direction at both end parts of this printed board 8 in the longitudinal direction are provided. As shown in FIG. 1A, in the state in which the printed board 8 is placed on the printed board placement base part 3b and is locked by the locking parts 32 and 33, the printed board 8 is not in contact with the inner wall surface of the case main body 2a and is in the state of being separated from the case main body 2a.

A large portion of part of the holder part 3a of the board holder 3 excluding an aperture 35 to be described later, the back side part of the printed board placement base part 3b, and a joining portion 3c between the board holder 3 and the case cap 2b are configured to contact with the inner wall of the case main body 2a to prevent the board holder 3 from becoming loose in the direction orthogonal to the axial center direction in the hollow part of the case main body 2a.

Furthermore, the pressure sensing component 7 comprising plural components shown in FIG. 1A and FIG. 3A are housed in the holder part 3a of the board holder 3. The plural components to detect writing pressure are collectively referred to herein as a writing pressure sensing component or sensor and are positioned in the housing of the pressure sensing component 7 in the holder part 3a. A core main body 42 of the core body 4 is joined to writing pressure sensor 7 and thereby the writing pressure applied to a protruding member 41 of the core body 4 is detected by the pressure sensing component 7. The configuration of the pressure sensing component 7 to detect writing pressure and the housing of the pressure sensing component 7 in the holder part 3a will be described in detail later.

In the board holder 3, a plane 3pn (see FIG. 3A) in the direction along the axial center direction is formed on the side opposed to the aperture 35 across the axial center position and on the opposite side to the placement plane of the printed board in the printed board placement base part 3b in the side circumferential surface of a tubular body 34 forming the holder part 3a. In this case, although detailed diagrammatic representation is omitted, this plane 3pn is a flush plane in the holder part 3a or in the direction along the axial center direction from the holder part 3a to the printed board placement base part 3b.

The plane 3pn facilitates placing the board holder 3 in a stable state without rolling on a determined work table plane. Furthermore, in the state in which the board holder 3 is placed on this work table plane, the aperture 35 of the holder part 3a is opened in the direction orthogonal to the above-described determined work table plane. In addition, the placement plane of the printed board in the printed board placement base part 3b is a plane parallel to the above-described determined work table plane. Therefore, work of housing the pressure sensing component 7 in the holder part 3a of the board holder 3 placed on the work table plane through the aperture 35 may be carried out. In addition, the printed board 8 may be placed and locked on the placement plane of the printed board placement base part 3b.

As shown in FIG. 3B, in this example, the board holder 3 is joined to the case cap 2b at the joining portion 3c at the end part of the printed board placement base part 3b on the opposite side to the holder part 3a in the longitudinal direction, and the case cap 2b and the board holder 3 are configured to be allowed to be treated as a monolithic component.

Therefore, in this example, a unit obtained by placing and fixing the printed board 8 on the printed board placement base part 3b of the board holder 3 and housing the pressure sensing component 7 in the holder part 3a and joining the ferrite core 6 around which the coil 5 is wound and the core body 4 to the board holder 3 may be treated as one component as described later. Furthermore, the position indicator 1 may be completed by housing the component in the hollow part of the case main body 2a. At this time, the board holder 3 is joined to the case cap 2b in such a manner as to be locked in the case main body 2a in the state in which the position of the center line of the holder part 3a along the axial center direction corresponds with the position of the center line of the tubular case main body 2a along the axial center direction.

As shown in FIG. 1A, one end side of the case main body 2a in the axial center direction is defined as the pen tip side of the position indicator 1 having a pen shape and the position indicator 1 has a through-hole 21 (opening) on the pen tip side of this case main body 2a.

In this example, the core body 4 comprises the protruding member (pen tip member) 41 that protrudes to the outside from the through-hole 21 of the case main body 2a and the core main body 42. The core body 4 may comprise a synthetic resin such as a polyacetal resin (e.g., DURA-CON®) in view of resistance against friction when the protruding member 41 is used while being made to abut against the operation surface.

The core main body 42 as illustrated is a rod-shaped body having a circular columnar shape with a smaller diameter than the diameter of the protruding member 41. The core main body 42 may have a rounded or conical tip. Furthermore, in this example, in the ferrite core 6, a through-hole 6a having an inner diameter larger than the diameter of the core main body 42 is formed along the axial center direction of the ferrite core 6. The core main body 42 of the core body 4 is sized and shaped to be inserted in the through-hole 6a of the ferrite core 6 and be joined to one of the plural components configuring the pressure sensing component 7 as described later.

Furthermore, one end side of the ferrite core 6 in the axial center direction thereof (on the opposite side to the side of the protruding member 41 of the core body 4) is joined to the holder part 3a of the board holder 3 with the intermediary of a material having elasticity, e.g., a drop-countermeasure member 9 formed of silicone rubber, in this example.

Furthermore, when the component obtained by joining and integrating the board holder 3 shown in FIG. 3B and the core body 4 and the ferrite core 6 around which the coil 5 is wound is inserted in the hollow part of the case main body 2a and the case main body 2a is joined to the case cap 2b, the other end side of the ferrite core 6 in the axial center direction abuts against a step part 22 formed around the through-hole 21 of the case main body 2a as shown in FIG. 1A. This causes the ferrite core 6 around which the coil 5 is wound to be fixed between the holder part 3a of the board holder 3 and the step part 22 of the case main body 2a with the intermediary of the drop-countermeasure member 9 comprising silicone rubber.

[Configuration Example of Sensor to Detect Writing Pressure]

Next, a description will be made below about the holder part 3a of the board holder 3 and the pressure sensing component 7 and housing of the pressure sensing component 7 in the holder part 3a. The writing pressure detection sensor in this example is the case of using a variable-capacitance capacitor whose capacitance changes according to the writing pressure applied to a core body similarly to those described by using Patent Document 1 to Patent Document 4 at the beginning.

As shown in FIG. 3A, the pressure sensing component 7 of this example comprises plural components including the dielectric 71, a terminal member 72, a holding member 73, an electrically-conductive member 74, and an elastic member 75. As shown in FIG. 3A, the surface of the dielectric 71 on the side on which the terminal member 72 is disposed serves as a first surface part 71a of the dielectric 71, and the surface of the dielectric 71 on the side on which the electrically-conductive member 74 and the elastic member 75 are disposed serves as a second surface part 71b of the dielectric 71.

As shown in FIG. 3D, a conductor member 71c is disposed over almost the whole surface of the first surface part 71a of the dielectric 71. Furthermore, as shown in FIG. 3A, a conductor member 71d is disposed on the second surface part 71b of the dielectric 71. Furthermore, the conductor member 71c and the terminal member 72 form a first electrode of the variable-capacitance capacitor of the pressure sensing component 7. Moreover, the electrically-conductive member 74 and the elastic member 75 are electrically coupled together to form a second electrode of the above-described variable-capacitance capacitor.

On the other hand, as shown in FIG. 3A, the holder part 3a of the board holder 3 is formed of the tubular body 34 having a hollow part and has a configuration in which the pressure sensing component 7 is arranged in the axial center direction and is housed in the hollow part.

In an embodiment of the pressure sensing component 7 comprising the above-described plural components, the dielectric 71 and the terminal member 72 do not move in the axial center direction in the holder part 3a formed of the tubular body 34 and, as shown in FIG. 3A, are inserted and housed from the direction that is orthogonal to the axial center direction of this tubular body 34 and is perpendicular to the board surface 8a of the printed board 8 through the aperture 35 that is formed at part of the side circumferential surface of the tubular body 34 forming the holder part 3a and is opened in a direction orthogonal to the axial center direction.

As shown in FIGS. 3A to 3C, the aperture 35 is positioned at the end part on the side of the printed board placement base part 3b in the side circumferential surface of the tubular body 34 forming the holder part 3a. This aperture 35 is an aperture that is opened in the direction orthogonal to the axial center direction and is opened in the direction perpendicular to the board surface 8a of the printed board 8 placed on the printed board placement base part 3b. This aperture 35 has a determined length d1 (see FIG. 3C) in the axial center direction and has a determined length d2 (diagrammatic representation is omitted) in the direction orthogonal to the axial center direction.

The length d1 is selected to be larger than the length (thickness) of the dielectric 71 and the terminal member 72 in the axial center direction when they are stacked in the axial center direction. The length d2 is selected to be slightly larger than the largest length in the direction orthogonal to the axial center direction of the dielectric 71 and the terminal member 72. By selecting the size of the lengths d1 and d2 in this manner, the dielectric 71 and the terminal member 72 stacked in the axial center direction may be positioned in the holder part 3a through the aperture 35.

Furthermore, in the tubular body 34 forming the holder part 3a, the inner diameter is set to d3 (see FIG. 3C) and an opening 36a is made on the side of the core body 4 in the axial center direction thereof. The part 36 having the opening 36a on the side of the core body 4 in the axial center direction does not have an opening in the side circumferential surface. In this embodiment, the length d2 of the aperture 35 in the side circumferential surface of the tubular body 34 in the direction orthogonal to the axial center direction is selected to be equal to the inner diameter d3 of the tubular body 34. However, at a part of a depression groove 39 to be described later, the length d2 is selected to be larger by the depth of this depression groove 39.

Moreover, the side of the printed board placement base part 3b in the tubular body 34 forming the holder part 3a is occluded by a wall part 37. On this wall part 37, the above-described locking part 32 is formed to protrude toward the printed board placement base part 3b. The aperture 35 is so formed as to expose this wall part 37 to the outside. Specifically, the aperture 35 is bored so that an opening having the above-described length d1 from the wall part 37 in the axial center direction is formed in the side circumferential surface of the tubular body 34.

Furthermore, at the part joined to the wall part 37 in the side circumferential surface of the tubular body 34, slits 38a and 38b having a determined width slightly larger than the thickness of the terminal member 72 in the axial center direction are formed. In addition, in the inner wall of the tubular body 34, the depression groove 39 (see FIG. 3C) having an inner diameter larger than the inner diameter d2 of the part at which the aperture 35 is formed in the tubular body 34 is formed at the position adjacent to these slits 38a and 38b in the axial center direction.

The dielectric 71 comprises a plate-shaped body that is sized and shaped to fit into the depression groove 39 and has a thickness corresponding to the width of the depression groove 39 in the axial center direction. Therefore, the dielectric 71 may be inserted and fitted into the depression groove 39 of the tubular body 34 through the aperture 35. In the fitted state, the dielectric 71 is kept from moving in the axial center direction in the tubular body 34 by the depression groove 39. In an embodiment, the dielectric 71 is pressed and biased by the electrically-conductive member 74 to be pushed against the side of the wall part 37 as described later. Thus, this depression groove 39 is optional.

Furthermore, the terminal member 72 is formed of an electrically-conductive member having a circular disc shape, e.g., a plate-shaped body of an electrically-conductive metal, that has a thickness slightly smaller than the width of the slits 38a and 38b of the tubular body 34 in the axial center direction and has an outer diameter corresponding to the inner diameter d3 of the tubular body 34. In addition, as shown in FIG. 3A, this terminal member 72 has pendent parts 72a and 72b fitted to the slits 38a and 38b of the tubular body 34. Therefore, the terminal member 72 may be inserted to make contact with the wall part 37 of the tubular body 34 through the aperture 35. By the insertion, the pendent parts 72a and 72b are fitted to the slits 38a and 38b of the tubular body 34 and are locked by the tubular body 34 so as not to move in the axial center direction.

Furthermore, at the central part of the plate surface of the terminal member 72 on the side of the dielectric 71, a bulging part 72c that bulges toward the dielectric 71 is positioned. This bulging part 72c facilitates making a secure contact between the dielectric 71 and the terminal member 72 when the dielectric 71 and the terminal member 72 are housed in the tubular body 34.

This terminal member 72 is the first electrode of the variable-capacitance capacitor. From the end surface as the upper end of this terminal member 72 on the side of the aperture 35 when the terminal member 72 is housed in the holder part 3a, a lead part 72d is positioned that straddles the wall part 37 of the tubular body 34 and is solder-connected to a portion 8b of the board surface 8a of the printed board 8 placed on the printed board placement base part 3b.

Moreover, in the terminal member 72, an L-shape projection 72e that protrudes toward the opposite side to the lead part 72d is positioned at substantially the center of the end surface as the upper end on the side of the aperture 35 when the terminal member 72 is housed in the holder part 3a. When the dielectric 71 and the terminal member 72 are housed in the holder part 3a, the end part of the dielectric 71 on the opening side is held by this L-shape projection 72e of the terminal member 72. When the lead part 72d of the terminal member 72 is solder-connected and fixed to the portion 8b of the board surface 8a of the printed board 8, the dielectric 71 does not drop off from the aperture 35 due to this L-shape projection 72e.

The holding member 73 includes a circular columnar shape part 73a in which a depression hole 73b to which the core main body 42 of the core body 4 is press-fitted. The depression hole 73b is made on the side facing the core body 4 in the axial center direction thereof, and a ring-shaped protrusion 73c in which a depression hole 73d to which the electrically-conductive member 74 is fitted is made on the opposite side to the side of the depression hole 73b in the axial center direction. In this case, depression hole 73b and depression hole 73d are so formed that the center line (axial center position) of the depression hole 73b and the center line (axial center position) of the depression hole 73d exist on one straight line.

The outer diameter (part in the circumferential direction) of the circular columnar shape part 73a of the holding member 73 is selected to be slightly smaller than the inner diameter d3 of the tubular body 34. Furthermore, the outer diameter of the ring-shaped protrusion 73c of the holding member 73 is selected to be smaller than the outer diameter of the circular columnar shape part 73a and be smaller than the inner diameter of a coil spring forming the elastic member 75 to be described later. In this case, a step part is formed between the ring-shaped protrusion 73c and the circular columnar shape part 73a. This step part is to lock an end part of the spring of the elastic member 75 to be described later.

Furthermore, in this embodiment, in the circular columnar shape part 73a and the ring-shaped protrusion 73c, slits 73e and 73f are formed to traverse the depression hole 73b and the depression hole 73d. Due to the existence of these slits 73e and 73f, the circular columnar shape part 73a and the ring-shaped protrusion 73c are configured to be capable of being elastically biased in a direction orthogonal to the axial center direction. In addition, on the side circumferential surface of the circular columnar shape part 73a of the holding member 73, engagement protrusions 73g and 73h are formed at positions opposed across the axial center position of the circular columnar shape part 73a.

On the other hand, in the side circumferential surface of the tubular body 34 forming the holder part 3a, engagement holes 34a and 34b (see FIG. 3C), with which the engagement protrusions 73g and 73h formed on the side circumferential surface of the circular columnar shape part 73a of the holding member 73 engage, are formed.

A length d4 (see FIG. 3C) of these engagement holes 34a and 34b in the axial center direction is set longer than the length, in the axial center direction, of the engagement protrusions 73g and 73h formed on the side circumferential surface of the circular columnar shape part 73a of the holding member 73. This allows the holding member 73 to move in the hollow part of the tubular body 34 in the axial core direction thereof even in the state in which the holding member 73 is housed in the hollow part of the tubular body 34 and the engagement protrusions 73g and 73h are engaged with the engagement holes 34a and 34b. The length d4 is selected to be such a value that the electrically-conductive member 74 can move in the axial center direction to abut against the dielectric 71 and can be elastically deformed in the state in which the whole of the pressure sensing component 7 is housed in the hollow part of the tubular body 34 as described later.

Next, as the electrically-conductive member 74, a component formed of an elastic member that has electrical conductivity and is elastically deformable, is employed. For example, the electrically-conductive member 74 is formed of silicone electrically-conductive rubber or pressurized electrically-conductive rubber. This electrically-conductive member 74 includes a larger-diameter part 74a formed of a circular columnar part whose outer diameter is equal to the outer diameter of the ring-shaped protrusion 73c of the holding member 73 and a smaller-diameter part 74b formed of a circular columnar part whose outer diameter is almost equal to the diameter of the depression hole 73d of the ring-shaped protrusion 73c. The center line positions of the larger-diameter part 74a and the smaller-diameter part 74b are the same.

The end surface of the larger-diameter part 74a on the opposite side to the smaller-diameter part 74b is configured to have a curved surface part that bulges into a bullet shape (dome shape) although not shown in the diagram. Furthermore, a consideration will be made about the case in which the electrically-conductive member 74 moves toward the dielectric 71 due to application of a writing pressure by a user to the core body 4. In this case, when making contact with the opposed surface of the dielectric 71, this electrically-conductive member 74 makes contact with the surface of the dielectric 71 from the tip of the curved surface part that bulges into the bullet shape in the electrically-conductive member 74 in such a manner that the contact area gradually becomes larger. Moreover, the height of the smaller-diameter part 74b of the electrically-conductive member 74 is selected to be almost equal to the depth of the depression hole 73d formed in the ring-shaped protrusion 73c of the holding member 73.

Furthermore, the elastic member 75 is formed of a coil spring having electrical conductivity for example. The elastic member 75 has a winding part 75a having elasticity and a terminal piece 75b at one end part of this winding part 75a, and has a bent portion 75c at the other end part of the winding part 75a. The winding part 75a of the coil spring forming the elastic member 75 is given a diameter that allows the electrically-conductive member 74 to be housed in the winding part 75a, and that is smaller than the diameter of the circular columnar shape part 73a of the holding member 73.

The bent portion 75c of the elastic member 75 is inserted to the bottom part of the depression hole 73d formed in the ring-shaped protrusion 73c from the slit 73f part of the ring-shaped protrusion 73c of the holding member 73. Therefore, when the smaller-diameter part 74b of the electrically-conductive member 74 is press-fitted to the ring-shaped protrusion 73c of the holding member 73, the end surface of the smaller-diameter part 74b of the electrically-conductive member 74 becomes the state of being in contact with and electrically coupled to the bent portion 75c of the elastic member 75 having electrical conductivity.

Furthermore, the terminal piece 75b of the elastic member 75 is configured to straddle the dielectric 71, the terminal member 72, and the wall part 37 and be solder-connected to an electrically-conductive pattern on the board surface 8a of the printed board 8 placed on the printed board placement base part 3b.

[Method for Housing Pressure Sensing Component 7 in Holder Part 3a]

First, the board holder 3 is placed on a work table plane, with the plane 3pn oriented toward the work table plane. In this state, the board holder 3 is positioned and locked on the work table plane in such a manner that the opening of the aperture 35 is oriented in the upward direction orthogonal to the work table plane and the placement plane of the printed board in the printed board placement base part 3b is parallel to the work table plane.

Next, the dielectric 71 and the terminal member 72 in the pressure sensing component 7 are housed in the hollow part of the tubular body 34 forming the holder part 3a through the aperture 35. At this time, the dielectric 71 and the terminal member 72 are housed in the hollow part of the tubular body 34 in the state in which the opening-side end part of the dielectric 71 housed in the hollow part of the tubular body 34 is held by the L-shape projection 72e of the terminal member 72. Furthermore, at this time, the dielectric 71 is housed in the depression groove 39 formed in the inner wall of the tubular body 34. In addition, the pendent parts 72a and 72b of the terminal member 72 are fitted to the slits 38a and 38b of the holder part 3a.

Next, in this example, the smaller-diameter part 74b of the electrically-conductive member 74 is press-fitted to the depression hole 73d of the ring-shaped protrusion 73c of the holding member 73. In addition, the winding part 75a of the elastic member 75 is disposed around the ring-shaped protrusion 73c and the electrically-conductive member 74. At this time, the bent portion 75c of the elastic member 75 is clamped between the upper end surface of the smaller-diameter part 74b of the electrically-conductive member 74 and the bottom part of the depression hole 73d of the ring-shaped protrusion 73c to electrically connect the bent portion 75c of the elastic member 75 to the electrically-conductive member 74.

Next, this unit obtained by combining the holding member 73, the electrically-conductive member 74, and the coil spring of the elastic member 75 is inserted into the hollow part of the tubular body 34 in the axial center direction from the side of the electrically-conductive member 74 through the opening 36a of the tubular body 34. Then, the unit is inserted in the axial center direction until the engagement protrusions 73g and 73h formed on the circular columnar shape part 73a of the holding member 73 are fitted to the engagement holes 34a and 34b formed in the side circumferential surface of the tubular body 34. At this time, in spite of the existence of the engagement protrusions 73g and 73h, because the slit 73e is formed, the circular columnar shape part 73a of the holding member 73 is elastically deformed in a direction orthogonal to the axial center direction and is inserted in the hollow part of the tubular body 34.

When the engagement protrusions 73g and 73h formed on the circular columnar shape part 73a of the holding member 73 become the state of being fitted to the engagement holes 34a and 34b formed in the side circumferential surface of the tubular body 34 of the holder part 3a, the holding member 73 is locked in the hollow part of the tubular body 34 of the holder part 3a without dropping off from the opening 36a of the tubular body 34 of the holder part 3a regardless of the biasing force of the elastic member 75 in the axial center direction. Furthermore, in this state, the dielectric 71 and the terminal member 72 are pressed against the side of the wall part 37 by the biasing force of the elastic member 75 in the axial center direction. This prevents the dielectric 71 and the terminal member 72 from dropping off from the aperture 35 of the tubular body 34.

That is, by the engagement between the engagement holes 34a and 34b formed in the tubular body 34 and the engagement protrusions 73g and 73h of the circular columnar shape part 73a of the holding member 73 and the biasing force of the elastic member 75, a locking configuration that prevents the dielectric 71 and the terminal member 72 forming part of the pressure sensing component 7 from being displaced in the direction orthogonal to the axial center direction is formed.

Next, in the state in which all of the plural components configuring the pressure sensing component 7 are housed and locked in the hollow part of the tubular body 34 of the holder part 3a in the above-described manner, the lead part 72d of the terminal member 72 is soldered to the portion 8b of the printed board 8 and the terminal piece 75b of the coil spring as the elastic member 75 is soldered to the printed board 8.

By this solder-fixing of the lead part 72d of the terminal member 72 and the terminal piece 75b of the elastic member 75 to the printed board 8, the dropping-off of the terminal member 72 through the aperture 35 of the holder part 3a can be prevented. Furthermore, in this example, the opening-side end part of the dielectric 71 housed in the hollow part of the tubular body 34 of the holder part 3a is held by the L-shape projection 72e of the terminal member 72. Thus, the dropping-off of the dielectric 71 from the aperture 35 of the tubular body 34 of the holder part 3a is prevented by the solder-fixing of this terminal member 72 to the printed board 8.

Meanwhile, the holding member 73 to which the electrically-conductive member 74 is fitted is in the state of being prevented from moving toward the core body 4 in the axial center direction because the engagement protrusions 73g and 73h are engaged with the engagement holes 34a and 34b of the tubular body 34. However, the holding member 73 can move in the hollow part of the tubular body 34 toward the dielectric 71 in the axial center direction. Furthermore, when the writing pressure is not applied, the state in which a gap is generated between the electrically-conductive member 74 and the dielectric 71 is obtained due to the biasing force of the elastic member 75.

After the pressure sensing component 7 is housed in the tubular body 34 forming the holder part 3a in the above-described manner, the drop-countermeasure member 9 is press-fitted to the opening 36a of the tubular body 34 as shown in FIG. 3B. This drop-countermeasure member 9 has a through-hole in which the core main body 42 of the core body 4 is inserted in the axial center direction and includes a circular columnar part having an outer diameter that is almost equal to or slightly smaller than the inner diameter of the part 36 on the side of the opening 36a of the tubular body 34. Furthermore, the drop-countermeasure member 9 is joined to the holder part 3a by press-fitting its circular columnar part into the part 36 on the side of the opening 36a of the tubular body 34.

Moreover, in the drop-countermeasure member 9, a recess whose inner diameter is also equal to the outer diameter of the ferrite core 6 is formed on the opposite side to the circular columnar part in the axial center direction. The end part of the ferrite core 6 on the opposite side to the side of the protruding member 41 of the core body 4 is press-fitted into this recess of the drop-countermeasure member 9. Thereby, the ferrite core 6 is joined to the holder part 3a of the board holder 3 with the intermediary of the drop-countermeasure member 9.

As described above, the drop-countermeasure member 9 may comprise a material having elasticity, e.g., silicone rubber. For this reason, due to the joining of the ferrite core 6 to the holder part 3a of the board holder 3 with the intermediary of this drop-countermeasure member 9, damage to the ferrite core 6 can be prevented even if the position indicator 1 is dropped and a high acceleration acts on the joining part between the ferrite core 6 and the holder part 3a.

Next, in the state in which the ferrite core 6 is joined to the board holder 3 as described above, the core main body 42 of the core body 4 is inserted in the through-hole 6a of the ferrite core 6. Then, an end part of the core main body 42 of the core body 4 is press-fitted to the depression hole 73b of the circular columnar shape part 73a of the holding member 73 housed in the holder part 3a. In this case, even in the state in which the core body 4 is press-fitted to the depression hole 73b of the circular columnar shape part 73a, the core main body 42 of the core body 4 is set to the state of being exposed also to the side of the protruding member 41 of the core body 4 of the ferrite core 6, and the core body 4 is allowed to be displaced toward the case cap 2b in the axial center direction against the biasing force of the elastic member 75 by the pressure (writing pressure) applied to the protruding member 41 of the core body 4.

In the above-described manner, the printed board 8 is placed on the printed board placement base part 3b of the board holder 3 and joined to the case cap 2b, and the pressure sensing component 7 is housed in the holder part 3a. Moreover, the ferrite core 6 is joined to the holder part 3a and the core body 4 is joined. Thereby, in an embodiment, the module component shown in FIG. 3B is formed.

Next, this module component is inserted in the hollow part of the case main body 2a, with the protruding member 41 of the core body 4 protruding to the outside from the through-hole 21 of the case main body 2a. Then, the case main body 2a and the case cap 2b are joined to complete the position indicator 1.

In this position indicator 1, when a pressure is applied to the protruding member 41 of the core body 4, the core body 4 is displaced according to the pressure in a direction in the case main body 2a in the axial center direction. Then, due to this displacement of the core body 4, the holding member 73 in the holder part 3a, to which the core main body 42 is joined, is displaced toward the dielectric 71 against the elastic biasing force of the elastic member 75. As a result, the electrically-conductive member 74 fitted to the holding member 73 is displaced toward the dielectric 71, so that the distance between the electrically-conductive member 74 and the dielectric 71 and furthermore the contact area between the electrically-conductive member 74 and the dielectric 71 change according to the pressure applied to the core body 4.

Due to this, the capacitance of the variable-capacitance capacitor formed between the terminal member 72 forming the first electrode and the electrically-conductive member 74 forming the second electrode changes according to the pressure applied to the core body 4. This change in the capacitance of the variable-capacitance capacitor is transmitted from the position indicator 1 to the position detecting device 202. The position detecting device 202 detects the writing pressure applied to the core body 4 of the position indicator 1.

Figure 4A:
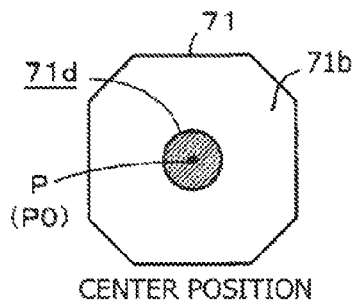
FIGS. 4A and 4B show diagrams for explaining a configuration in which a conductor member is attached to a second surface part of a dielectric.
Figure 4B:
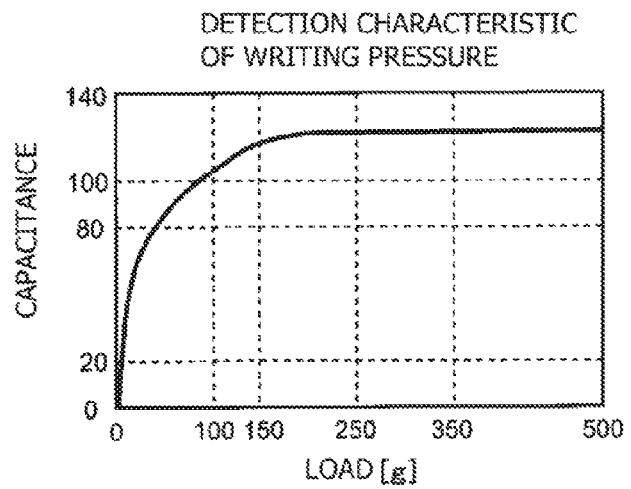

Furthermore, in an embodiment, the position indicator 1, as shown in FIG. 3A, the conductor member 71d is attached to the surface (second surface part 71b) of the dielectric 71 on the side opposed to the electrically-conductive member 74 and the elastic member 75 forming the second electrode. FIGS. 4A and 4B show diagrams for explaining the configuration in which the conductor member 71d is attached to the second surface part 71b of the dielectric 71. Also as described above, the electrically-conductive member 74 and the elastic member 75 form the second electrode. To the second surface part 71b of the dielectric 71 on the side opposed to the electrically-conductive member 74, the conductor member 71d is attached as shown in FIG. 3A and as shown also in FIG. 4A in an enlarged manner.

In this embodiment, as shown in FIG. 4A, the conductor member 71d having a circular shape is provided on the second surface part 71b of the dielectric 71 in such a manner that a center P of the second surface part 71b of the dielectric 71 is set to a center PO of the conductor member 71d, for example. Furthermore, if the electrically-conductive member 74 to which the elastic member 75 functioning as a terminal part contacts the conductor member 71d attached to the second surface part 71b of the dielectric 71, this conductor member 71d also functions as the second electrode.

The conductor member 71d attached to the second surface part 71b of the dielectric 71 has a determined area. Thus, due to the contact of the electrically-conductive member 74, the conductor member 71d forms a capacitor with the first electrode formed of the conductor member 71c and the terminal member 72. The electrical capacitance of the capacitor is determined by the areas of the opposed electrodes, the distance between the electrodes, and the dielectric constant of the dielectric. On the other hand, also as described above, the end surface of the larger-diameter part 74a of the electrically-conductive member 74 on the opposite side to the smaller-diameter part 74b is configured to have a curved surface part that bulges into a bullet shape.

For this reason, when the tip of the bullet-shaped curved surface of the electrically-conductive member 74 contacts with the conductor member 71d, the capacitor formed by the conductor member 71c forming the first electrode and the conductor member 71d that has become the second electrode functions and the electrical capacitance of this capacitor rapidly rises up to a determined value. Thereafter, the electrical capacitance of the variable-capacitance capacitor formed by the dielectric 71 and the conductor member 71c and the electrically-conductive member 74 that sandwich it changes according to the contact area between the second surface part 71b of the dielectric 71, to which the conductor member 71d is attached, and the electrically-conductive member 74.

In this case, although the slight part of the tip of the bullet-shaped curved surface of the electrically-conductive member 74 only makes contact with the conductor member 71d, the capacitor formed by the conductor member 71c forming the first electrode and the conductor member 71d that has become the second electrode functions. Furthermore, the electrical capacitance of this capacitor rapidly rises up to a determined value according to the opposing area between the conductive member 71c and the conductive member 71d, which is larger than the relevant contact area between the electrically-conductive member 74 and the conductor member 71d. Thereafter, the electrical capacitance of the variable-capacitance capacitor formed by the dielectric 71 and the conductor member 71c and the electrically-conductive member 74 that sandwich it changes according to the contact area between the second surface part 71b of the dielectric 71, to which the conductor member 71d is attached, and the electrically-conductive member 74.

That is, in the position indicator 1 of this embodiment, in the pressure sensing component 7 configured as the variable-capacitance capacitor, the initial rise at the time of writing pressure detection is rapid and the subsequent writing pressure detection can also be carried out in a comparatively-wide range (wide range) as the writing pressure detection characteristic is shown in FIG. 4B. In other words, the pressure sensing component 7 can facilitate realizing a position indicator in which both the initial rise characteristic at the time of writing pressure detection and the resolution of the writing pressure are improved and that is suitable to be used for a portable terminal.

As above, the position indicator 1 in which both the initial rise characteristic at the time of writing pressure detection and the resolution of the writing pressure are favorable is suitable to be used for various pieces of portable equipment that include a touch panel and are used while being held with a hand by a user, such as high-function mobile phone terminals and tablet PCs.

[Other Characteristics in Configuration]

In the position indicator 1 of the above-described embodiment, the elastic member 75 that functions as a terminal part and functions also as the elastic member is provided around the electrically-conductive member 74. This elastic member 75 does not only function as a terminal part but also has a function of biasing the core body 4 from the inside of the case 2 to the outside along the central axis of the core body. Due to this function of the elastic member 75, only when a writing pressure is applied to the core body by a user, the core body moves to the inside of the case 2 and the electrically-conductive member 74 is pressed against the second surface part 71b of the dielectric 71.

Furthermore, in the position indicator 1 of the above-described embodiment, the conductor member 71c as the first conductor disposed on the first surface part 71a of the dielectric 71 and the terminal member 72 form the first electrode. Furthermore, the area of the conductor member 71d as the second conductor disposed on the second surface part 71b of the dielectric 71 may be set small compared with the area of the conductor member 71c disposed on the first surface part 71a of the dielectric 71. This is because, as the area of the conductor member 71d as the second conductor becomes closer to the area of the conductor member 71c as the first conductor, the dynamic range for expressing the writing pressure becomes smaller and the resolution of the writing pressure becomes lower as a result.

For this reason, the area of the conductor member 71d may be selected so that the initial electrical capacitance is at a level slightly surpassing a determined writing pressure detection threshold value for writing pressure detection in the variable-capacitance capacitor formed with the dielectric 71 and the conductor member 71c, for example. Of course, it is possible to set the area of the conductor member 71d to various areas to obtain a determined characteristic. However, in an embodiment, the area of the conductor member 71d is set small compared with the area of the conductor member 71c disposed on the first surface part 71a of the dielectric 71. As above, the conductor member 71d contributes to formation of the initial electrical capacitance of the pressure sensing component 7 configured as the variable-capacitance capacitor.

Furthermore, also as described above, change in the writing pressure is allowed to be detected according to the contact area between the second surface part 71b of the dielectric 71 and the electrically-conductive member 74 without the intermediary of the conductor member 71d as the second conductor. Specifically, change in the writing pressure can be detected according to the area of the part where the electrically-conductive member 74 spreads out of the conductor member 71d and contacts with the second surface part 71b of the dielectric 71. Therefore, the detection range of the writing pressure may also be facilitated by defining the area of the conductor member 71c.

Furthermore, the surface of the second surface part 71b of the dielectric 71 opposed to the electrically-conductive member 74 may be subjected to mirror surface processing. This can increase the degree of tight contact between the second surface part 71b of the dielectric 71 and the electrically-conductive member 74 and facilitate ensuring the electrical capacitance of the variable-capacitance capacitor formed by sandwiching the dielectric 71 by the conductor member 71c and the electrically-conductive member 74.

Furthermore, in an embodiment, the variable-capacitance capacitor formed by sandwiching the dielectric 71 by the conductor member 71c and the electrically-conductive member 74 has the following characteristic. Specifically, the variable-capacitance capacitor has determined capacitance according to the areas of the conductor member 71c (first conductor) and the conductor member 71d (second conductor) promptly after the electrically-conductive member 74 makes contact with the conductor member 71d attached to the second surface part 71b of the dielectric 71.

Then, when the writing pressure is further applied and pressing of the electrically-conductive member 74 against the second surface part 71b of the dielectric 71 is progressed, the electrically-conductive member 74 spreads out of the conductor member 71d and makes contact with the second surface part 71b of the dielectric 71. When the area of this part where the electrically-conductive member 74 spreads out of the conductor member 71d and makes contact with the second surface part 71b of the dielectric 71 changes, the electrical capacitance of the variable-capacitance capacitor formed by sandwiching the dielectric 71 by the conductor member 71c and the electrically-conductive member 74 also changes. Therefore, the changing electrical capacitance of the variable-capacitance capacitor becomes electrical capacitance according to change in the writing pressure, which allows detection of the writing pressure.

Modification Examples

In the above-described embodiment, as described by using FIG. 3A and FIG. 4A, a member having a circular shape is employed as the conductor member 71d and the conductor member 71d is disposed on the second surface part 71b in such a manner that the center P of the second surface part 71b of the dielectric 71 is set to the center PO of the conductor member 71d. However, the conductor member 71d is not limited thereto. The conductor member 71d is not limited to the circular shape and can be formed into various shapes such as an elliptical shape, a fan shape, and a polygonal shape. Any shape may be employed as long as it is configured to have an area.

Figure 5A:
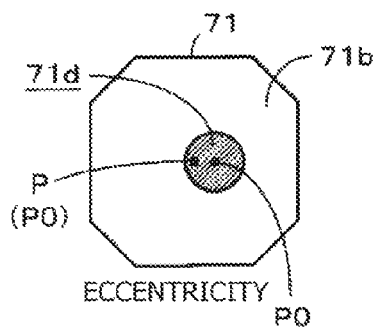
FIGS. 5A to 5D show diagrams for explaining one example of variations of placement position and shape of a conductor member.

FIGS. 5A, 5B, 5C and 5D show diagrams for explaining one example of variations of the placement position and shape of the conductor member 71d. In the case of attaching the conductor member 71d to the second surface part 71b of the dielectric 71, the centers of both do not need to be set in the same position. For example, as shown in FIG. 5A, the center P of the second surface part 71b of the dielectric 71 and the center PO of the conductor member 71d may be deviated from each other. In the case of the example shown in FIG. 5A, the initial rise characteristic may be improved. In addition, the dynamic range of the writing pressure can be widened because a large area can be ensured as the area of the part where the electrically-conductive member 74 spreads out of the conductor member 71d and makes contact with the second surface part 71b of the dielectric 71 after the contact.

Figure 5B:
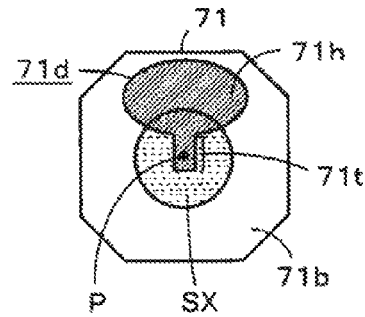
Figure 5C:
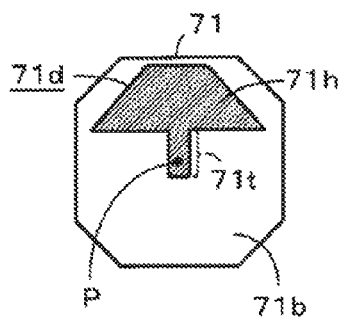
Figure 5D:
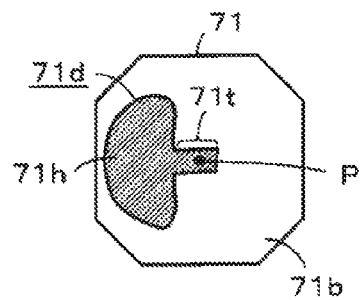

Furthermore, as shown in FIGS. 5B, 5C, and 5D, the conductor member 71d disposed on the second surface part 71b of the dielectric 71 may be formed into a shape in which a protruding part 71t makes contact with the tip part of the electrically-conductive member 74 is provided around the center of the second surface part 71b of the dielectric 71 and a main body part 71h that has an area part having a spread is provided at one tip of this protruding part 71t. In the case of employing this, the initial electrical capacitance of the variable-capacitance capacitor formed by sandwiching the dielectric 71 by the conductor member 71c and the conductor member 71d and the electrically-conductive member 74 may be increased. Therefore, the initial rise level at the time of writing pressure detection may be further increased. However, if the area of the main body part 71h is set too large, this also leads to narrowing of the dynamic range of the writing pressure. Thus, the size of the main body part 71h may be selected to facilitate avoiding loss of dynamic range.

Furthermore, as shown in FIGS. 5A, 5B, 5C and 5D, part of the conductor member 71d lies at the position with which the tip of the electrically-conductive member 74 makes contact. Thus, the position at which the conductor member 71d is attached (disposed) can be set to an appropriate position.

Furthermore, for example if it is assumed that a part shown by a circular shape SX is the contact range of the electrically-conductive member 74 in FIG. 5B, the area of the part where the electrically-conductive member 74 spreads out of the conductor member 71d and makes contact with the second surface part 71b of the dielectric 71 is a part shown by a horizontal dotted line inside the circular shape SX. That is, the part where the electrically-conductive member 74 makes contact with the second surface part 71b of the dielectric 71 without the intermediary of the conductor member 71d is the part where the electrically-conductive member 74 spreads out of the conductor member 71d and makes contact with the second surface part 71b of the dielectric 71.

As above, the modification examples of the conductor member 71d shown in FIGS. 5A to 5D are the conductor members 71d formed into shapes in which the center position (centroid) of the conductor member 71d is a position eccentric from the center of the second surface part 71b of the dielectric 71. Here, the center position of the conductor member 71d may be selected as the point on which a resultant force equivalent to the action of the gravitational force acting on the respective parts of the conductor member 71d acts. Therefore, as shown in FIG. 5A, the center position (centroid) of the conductive member 71d having a precise circular shape corresponds with the center PO of this conductive member 71d having the precise circular shape. Furthermore, in the case of the conductive members 71d of FIGS. 5B, 5C, and 5D, the electrically-conductive member 71d has the protruding part 71t and the main body part 71h and its center position is located in the main body part 71h.

Moreover, in all of the modification examples of the conductor member 71d shown in FIGS. 5A to 5D, the curved surface part of the electrically-conductive member 74 can directly make contact with the second surface part 71b of the dielectric 71 without the intermediary of the conductive member 71d after the contact of the tip of the curved surface part of the electrically-conductive member 74 with the conductor member 71d. Then, a larger area is allowed to be the area of the direct contact of the curved surface part of the electrically-conductive member 74 with the second surface part 71b of the dielectric 71 without the intermediary of the conductive member 71d as the writing pressure applied to the core body 4 becomes higher.

For the conductor member 71c and the conductor member 71d, a metal such as silver or copper, carbon, or the like may be used. The conductive members may be attached to the dielectric 71 by various methods such as evaporation, welding, adhesive bonding, and pressure bonding. Of course, it is possible to form the conductor members 71c and 71d, the terminal member 72, the elastic member 75, and so forth by using various conductor materials appropriate on each member basis, such as metals, carbon, and electrically-conductive rubber.

Furthermore, in the above-described embodiment, the description is made based on the assumption that the position indicator 1 carries out position indication to the position detecting device 202 of the electromagnetic induction system. However, the configuration is not limited thereto. Embodiments may be applied also to a position indicator for a position detecting device including a sensor of the capacitance system (surface type (surface capacitance type) and projection type (project capacitance type)). Furthermore, embodiments may be applied also to a position indicator for a position detecting device including a sensor of the electromagnetic exchange system (electromagnetic resonance (EMR®)).

[Configuration Example of Position Indicator 1]

Figure 6A:
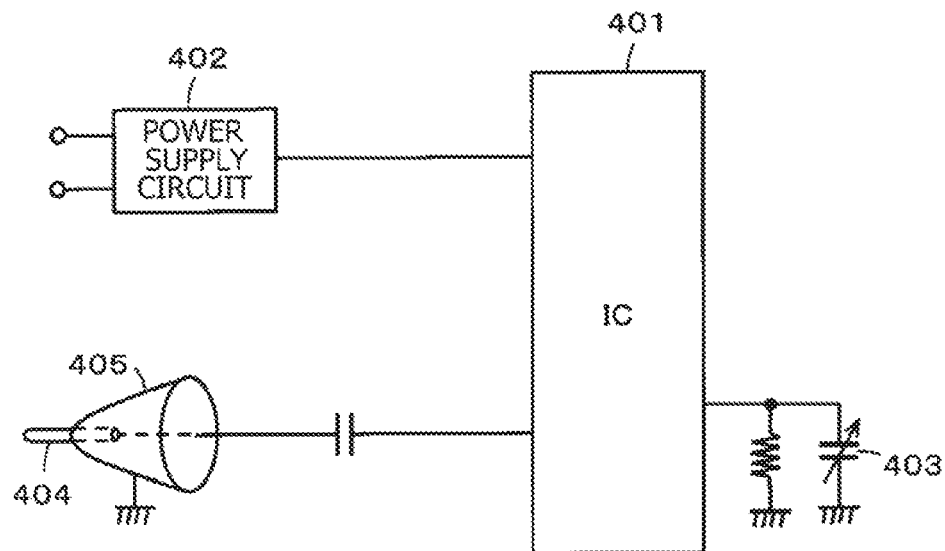
FIGS. 6A and 6B show diagrams for explaining configuration examples of a position indicator.
Figure 6B:
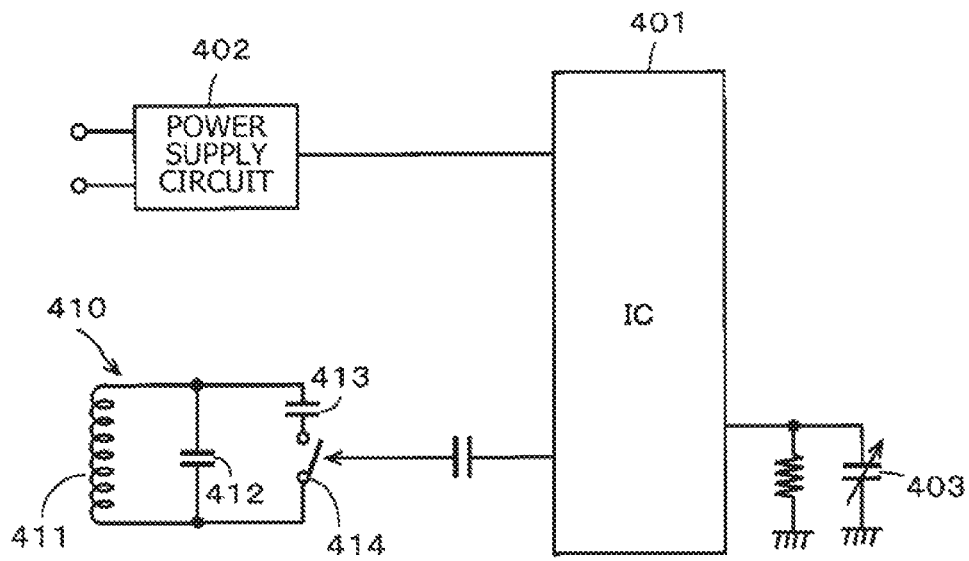

FIGS. 6A and 6B show diagrams for explaining examples of the circuit configuration of the position indicator 1. FIG. 6A shows a configuration example of a position indicator used for a position detecting device including a sensor of the capacitance system. As shown in FIG. 6A, the position indicator of this example includes a power supply circuit 402 for an IC 401, a variable-capacitance capacitor 403 equivalent to the variable-capacitance capacitor formed in the pressure sensing component 7 in the above-described embodiment, and a core body 404 and a chassis 405 that are both formed of an electrically-conductive material. In the case of this example, for example, power supplied through a charge terminal is stored in a battery incorporated in the power supply circuit 402 and a drive power supply is provided from this battery to the IC 401.

Furthermore, the position indicator has a configuration in which the position indicator is electrically coupled to a user through the chassis 405 and the core body 404 with which a hand of the user makes contact and can cause change in the capacitance at the contact position with the sensor of the capacitance system. Moreover, the IC 401 is capable of forming a digital signal of, e.g., eight bits to notify the writing pressure on the basis of the capacitance of the variable-capacitance capacitor 403 that changes according to the writing pressure, and transmitting it through the core body 404.

In contrast, FIG. 6B shows a configuration example of a position indicator used for a position detecting device including a sensor of the electromagnetic induction exchange system. In FIG. 6B, an IC 401, a power supply circuit 402, and a variable-capacitance capacitor 403 are similar to those shown in FIG. 6A. However, it is possible to employ a configuration in which energy obtained by receiving an electromagnetic induction signal from the position detecting device including the sensor of the electromagnetic induction exchange system is supplied to the power supply circuit 402 and a drive power supply is formed to be utilized.

The position indicator shown in FIG. 6B forms a resonant circuit 410 by a coil 411 as an inductance element and a capacitor 412. Furthermore, as shown in FIG. 6B, a capacitor 413 and a switch 414 that are coupled in series are coupled in parallel to the resonant circuit 410. The switch 414 is on/off-controlled by the IC 401.

The electromagnetic induction signal sent out from the position detecting device including the sensor of the electromagnetic exchange system is received by the resonant circuit 410, and it is stored in the resonant circuit 410 to be sent back to this position detecting device. The signal sent back from the position indicator in this manner is received by a sensor coil near the position indicator in the position detecting device and the position indicated by the position indicator is detected.

The variable-capacitance capacitor 403 for detecting the writing pressure is coupled to the IC 401 also as described above and change in the capacitance according to the writing pressure can be detected. Specifically, the IC 401 detects the writing pressure applied to the pen tip of the position indicator from the capacitance value of the variable-capacitance capacitor 403. Then, the IC 401 converts the detected writing pressure to a digital signal of, e.g., eight bits. Through on/off-control of the switch 414 by the IC 401, this digital signal is transmitted from the position indicator to the position detecting device including the sensor of the electromagnetic exchange system and is detected in this position detecting device.

Figure 7:
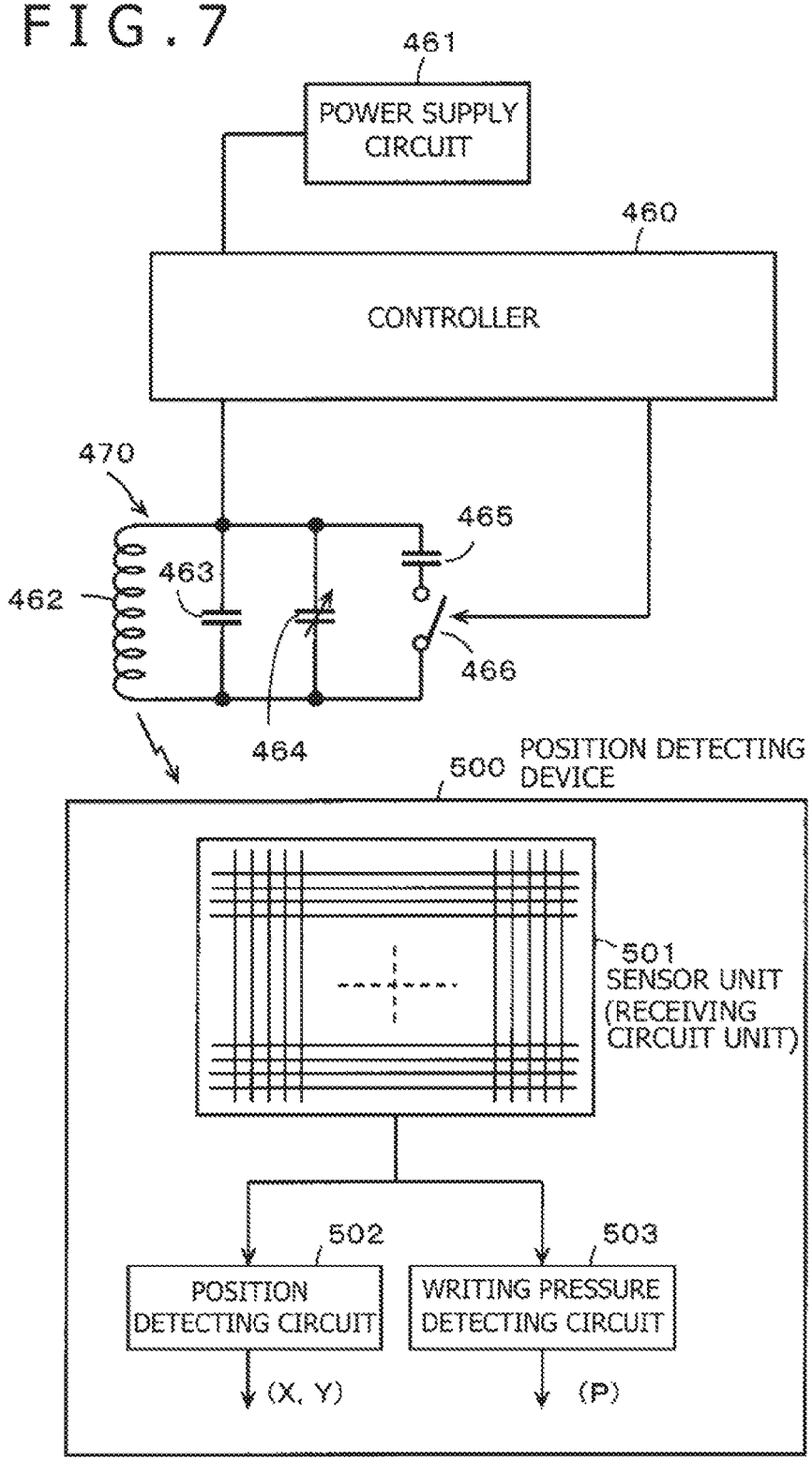
FIG. 7 is a diagram for explaining another configuration example of a position indicator.
Figure 8:
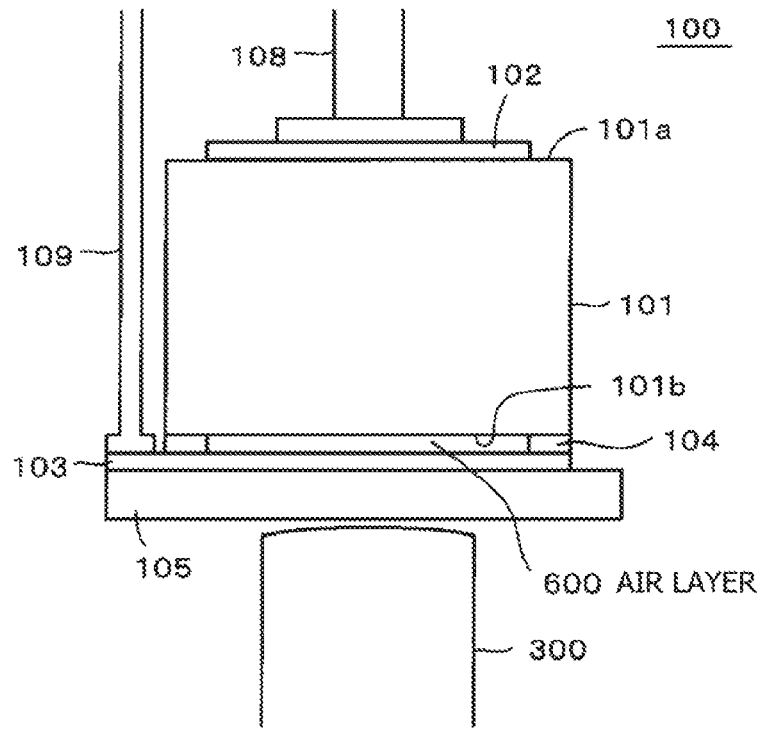
FIGS. 8A and 8B show diagrams for explaining one example of a conventional variable-capacitance capacitor.
Figure 8:
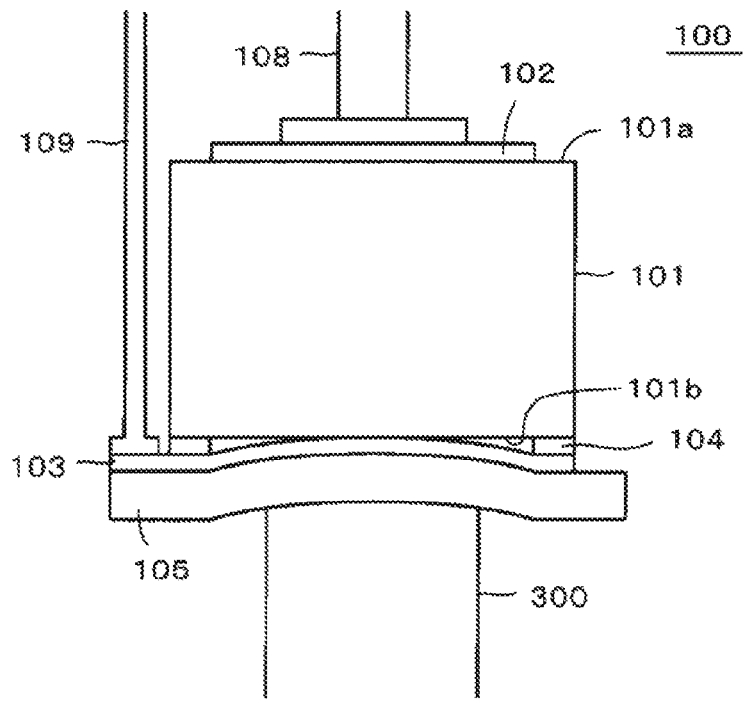

FIG. 7 is a diagram for explaining another configuration example of the position indicator for the position detecting device including the sensor of the electromagnetic exchange system. As shown in FIG. 7, the position indicator of this example includes a power supply circuit 461 for a controller 460, a resonant circuit 470 comprising a coil 462 and a capacitor 463, and a variable-capacitance capacitor 464 that is provided in parallel to this resonant circuit 470 and is for writing pressure detection. The variable-capacitance capacitor 464 is equivalent to the variable-capacitance capacitor formed in the pressure sensing component 7 in the above-described embodiment. Furthermore, the power supply circuit 461 is the same as the power supply circuit 402 shown in FIGS. 6A and 6B. Moreover, a capacitor 465 and a switch 466 coupled in series are coupled in parallel to the resonant circuit 470 and the variable-capacitance capacitor 464.

Due to control by the controller 460, the position indicator of this example carries out switching between a period in which a signal showing an indicated position is returned through the resonant circuit 470 and a period in which a signal according to the writing pressure detected by the variable-capacitance capacitor 464 is returned. This enables detection of the indicated position and detection of the writing pressure in the position detecting device including the sensor of the electromagnetic exchange system. The position indicator having the configuration shown in FIG. 6B notifies the writing pressure by a digital system, whereas the position indicator having the configuration shown in FIG. 7 can notify the writing pressure by an analog system.

A position detecting device 500 including the sensor of the electromagnetic exchange system includes a sensor unit or circuit 501, a position detecting circuit 502, and a writing pressure detecting circuit 503. The sensor unit 501 functions as a receiving circuit that receives a signal from the position indicator. The position detecting circuit 502 detects a coordinate position (X, Y) on the sensor unit indicated by the position indicator on the basis of a detection output from the sensor unit 501. The writing pressure detecting unit 503 detects change in the capacitance of the variable-capacitance capacitor of the position indicator as change in the external force applied to the position indicator (writing pressure) on the basis of a detection output from the sensor unit 501. As above, the position detecting device 500 is capable of detection of the indicated position on the sensor unit indicated by the position indicator and the writing pressure (external force) applied to the position indicator.

A position detecting device including a sensor of the capacitance system can also be configured similarly to the position detecting device including a sensor of the electromagnetic exchange system shown in FIG. 7 although there is a difference in the detection system of the indicated position. Specifically, the position detecting device has a configuration that has a function of detecting the position indicated by a position indicator and includes a receiving circuit that receives a signal according to the writing pressure from the position indicator and a detecting circuit that detects the external force (writing pressure) applied to the position indicator from the signal received by this receiving circuit.

[Others]

As is apparent also from the explanation of the above-described embodiment, the respective functions of the chassis, the core body, and the variable-capacitance capacitor in the position indicator of claim 1 are realized by the case 2, the core body 4, and the pressure sensing component 7 of the position indicator 1 of the embodiment. Furthermore, the functions of the dielectric of the variable-capacitance capacitor in claim 1 are realized by the dielectric 71 of the position indicator 1, and the first electrode part comprising the first conductor and a terminal part is realized by the conductor member 71c and the terminal member 72. The functions of the second conductor of the same variable-capacitance capacitor are realized by the conductor member 71d. The electrically-conductive member of the same variable-capacitance capacitor is realized by the electrically-conductive member 74 of the position indicator 1. The functions of the elastic member of the same variable-capacitance capacitor are realized by the elastic member 75 of the position indicator 1.

DESCRIPTION OF REFERENCE SYMBOLS

1 . . . Position indicator
2a . . . Case main body
2b . . . Case cap
3 . . . Board holder
3a . . . Pressure sensing component holder part
3b . . . Printed board placement base part
4 . . . Core body
5 . . . Coil
6 . . . Ferrite core
7 . . . Pressure sensing component
71 . . . Dielectric
71a . . . First surface part
71b . . . Second surface part
71c . . . Conductor member (first conductor)
71d . . . Conductor member (second conductor)
72 . . . Terminal member
74 . . . Electrically-conductive member
75 . . . Elastic member
8 . . . Printed board
9 . . . Drop-countermeasure member
35 . . . Aperture

The invention claimed is:

1. A position indicator, comprising:
    a chassis;
    a core body having a substantially rod shape housed in the chassis, with one end of the core body protruding outside of the chassis; and
    a variable capacitance capacitor, wherein,
    in operation, the capacitance of the variable capacitance capacitor changes in response to force applied through the core body;
    the variable capacitance capacitor includes:
        a dielectric having a first surface and a second surface opposed to the first surface;
        a first conductor disposed on the first surface of the dielectric;
        a first terminal coupled to the first conductor of the dielectric, forming a first electrode of the variable capacitance capacitor with the first conductor;
        a second conductor disposed on the second surface of the dielectric;
        an electrically-conductive member disposed opposed to the second surface of the dielectric;
        a second terminal that forms a second electrode of the variable capacitance capacitor with the second conductor and the electrically-conductive member; and
        an elastic member, which, in operation, applies a biasing force to separate the electrically-conductive member from the second surface of the dielectric; and
    in operation, the electrically-conductive member contacts the second conductor on the second surface of the dielectric in response to the force applied through the core body, and, in response to the contact, a capacitance of the capacitor changes to determined capacitance according to an opposing area between the first conductor and the second conductor, the opposing area being larger than a contact area between the electrically-conductive member and the second conductor.

2. The position indicator according to claim 1, comprising:
    a circuit, which, in operation, transmits a signal according to the force applied through the core body, wherein the first terminal part and the second terminal part are coupled to the circuit.

3. The position indicator according to claim 1 wherein, in operation, the capacitance of the variable capacitance capacitor changes according to a change in the force applied through the core body and depends on an area of contact between the electrically-conductive member and the second surface of the dielectric as the electrically conductive member spreads out beyond the second conductor and contacts the second surface of the dielectric.

4. The position indicator according to claim 1 wherein the second conductor has a smaller area than the first conductor.

5. The position indicator according to claim 1 wherein,
    the electrically-conductive member includes a curved surface that bulges toward a side opposed to the second surface of the dielectric and, in operation, gradually contacts the second surface of the dielectric from a tip of the curved surface, and
    the second conductor is positioned where the tip of the curved surface of the electrically-conductive member contacts the second surface of the dielectric.

6. The position indicator according to claim 1 wherein
    a surface of the second surface of the dielectric opposed to the electrically-conductive member is a mirror processed surface.

7. The position indicator according to claim 1 wherein, in operation,
    the variable capacitance capacitor has a determined capacitance according to areas of the first conductor and the second conductor after the electrically-conductive member makes contact with the second conductor, and the capacitance of the variable capacitance capacitor changes in response to changes in the force applied through the core body based on changes in an area of contact between the electrically-conductive member and the second surface of the dielectric as the electrically-conductive member spreads beyond the second conductor and makes contact with the second surface of the dielectric.

8. The position indicator according to claim 1 wherein the second conductor has a center position which corresponds with a center position of the second surface of the dielectric.

9. The position indicator according to claim 1 wherein the second conductor has a shape with a center position eccentric from a center of the second surface of the dielectric.

10. The position indicator according to claim 1, comprising:
a resonant circuit including the variable capacitance capacitor, wherein, in operation, the position indicator couples to a position detecting device of an electromagnetic induction system.

11. The position indicator according to claim 1 wherein the core body is formed of an electrically-conductive material and, in operation, the position indicator couples to a position detecting device of a capacitance system by allowing a user and the core body to be electrically coupled.

12. A position detecting device, comprising:
a position indicator, the position indicator including a chassis, a core body having a substantially rod shape housed in the chassis, with one end of the core body protruding outside of the chassis, and a variable capacitance capacitor, wherein, in operation, the capacitance of the variable capacitance capacitor changes in response to force applied through the core body, the variable capacitance capacitor including a dielectric having a first surface and a second surface opposed to the first surface, a first conductor disposed on the first surface of the dielectric, a first terminal coupled to the first conductor of the dielectric, forming a first electrode of the variable capacitance capacitor with the first conductor, a second conductor disposed on the second surface of the dielectric, an electrically-conductive member disposed opposed to the second surface of the dielectric, a second terminal that forms a second electrode of the variable capacitance capacitor with the second conductor and the electrically-conductive member, and an elastic member, which, in operation, applies a biasing force to separate the electrically-conductive member from the second surface of the dielectric, wherein, in operation, the electrically-conductive member contacts the second conductor on the second surface of the dielectric in response to the force applied through the core body, and, in response to the contact, a capacitance of the variable capacitance capacitor changes to a determined capacitance accordingly to an opposing area between the first conductor and the second conductor,
the opposing area being larger than a contact area between the electrically-conductive member and the second conductor;
a receiving circuit, which, in operation, receives a signal from the position indicator; and
a detecting circuit, which, in operation, detects, from the received signal, change in the capacitance as change in a writing pressure applied to the position indicator.

* * * * *